US 6,738,061 B2

(12) United States Patent
Suzuki

(10) Patent No.: US 6,738,061 B2
(45) Date of Patent: May 18, 2004

(54) METHOD, APPARATUS, STORAGE MEDIUM, PROGRAM, AND PROGRAM PRODUCT FOR GENERATING IMAGE DATA OF VIRTUAL THREE-DIMENSIONAL SPACE

(75) Inventor: Satoshi Suzuki, Kamakura (JP)

(73) Assignee: NAMCO Ltd., Tokyo (JP)

( * ) Notice: Subject to any disclaimer, the term of this patent is extended or adjusted under 35 U.S.C. 154(b) by 418 days.

(21) Appl. No.: 09/988,346

(22) Filed: Nov. 19, 2001

(65) Prior Publication Data

US 2002/0070935 A1 Jun. 13, 2002

(30) Foreign Application Priority Data

Dec. 11, 2000 (JP) .......................... 2000-376703

(51) Int. Cl.[7] .............................................. G06T 15/70
(52) U.S. Cl. ....................... 345/422; 345/426
(58) Field of Search ................... 345/419, 421, 345/422, 418, 426, 629

(56) References Cited

U.S. PATENT DOCUMENTS

| 5,280,568 | A | * | 1/1994 | Obata | 345/421 |
| 6,429,877 | B1 | * | 8/2002 | Stroyan | 345/611 |
| 2001/0018362 | A1 | * | 8/2001 | Minagawa et al. | 463/31 |
| 2002/0004421 | A1 | * | 1/2002 | Itai | 463/31 |
| 2002/0070935 | A1 | * | 6/2002 | Suzuki | 345/422 |
| 2002/0180808 | A1 | * | 12/2002 | Fujita et al. | 345/848 |

FOREIGN PATENT DOCUMENTS

| JP | A 11-203486 | 7/1999 |
| JP | A 2000-11205 | 1/2000 |

* cited by examiner

Primary Examiner—Mark Zimmerman
Assistant Examiner—Huedung X. Cao
(74) Attorney, Agent, or Firm—Oliff & Berridge PLC

(57) ABSTRACT

A method for reflecting color data of back or far surfaces of a plurality of transparent polygons overlapped with each other in an eyes direction, on a display screen. The method for generating image data of a virtual three-dimensional space viewed from a predetermined view point, comprises: determining a plurality of transparent primitive surfaces in the virtual three-dimensional space; operating an angle between an eyes direction at the predetermined view point and a normal direction to each of the transparent primitive surfaces; deciding a description order of the plurality of transparent primitive surfaces so as to give priority one of the transparent primitive surfaces when the angle is an acute angle over one of the transparent primitive surfaces when the angle is an obtuse angle; and describing the plurality of transparent primitive surfaces by composing color data of the transparent primitive surfaces in the description order.

13 Claims, 12 Drawing Sheets

METHOD, APPARATUS, STORAGE MEDIUM, PROGRAM, AND PROGRAM PRODUCT FOR GENERATING IMAGE DATA OF VIRTUAL THREE-DIMENSIONAL SPACE

BACKGROUND OF THE INVENTION

1. Field of the Invention

The invention relates a method, an apparatus, a storage medium, a program, and a program product, for displaying a plurality of transparent primitive surfaces (transparent primitive surfaces or translucent primitive surfaces) provided in a virtual three-dimensional space.

2. Description of Related Art

Conventionally, a game apparatus for displaying a virtual three-dimensional space created by three-dimensional computer graphics is known. Such a game apparatus arranges objects consisting of a plurality of polygons (primitive surfaces) in a virtual three-dimensional space represented in a world coordinate system, and generates images viewed from a view point in the virtual three-dimensional space.

That is, the game apparatus operates coordinate values and a direction of each object (polygons constituting each object, vertexes constituting each polygon) in the world coordinate system. Then, the game apparatus determines a view point, an eyes direction, and a view volume (a field of view; a pyramid determined by a field of view angle and a Z direction depth of field) of the view point, and transforms the coordinate values and the direction of each object represented in the world coordinate system to those represented in a viewing coordinate system. Then, the game apparatus performs a hidden surfaces processing to the polygons, and perspective projects the polygons in a screen coordinate system. Thereby, the game apparatus decides a color of each pixel of a frame buffer (a screen).

As one algorithm of the hidden surfaces processing, it is a Z buffer algorithm. In order to perform the Z buffer algorithm, the game apparatus prepares a Z buffer that is a storage area therein. The Z buffer is a storage area storing Z values in the screen coordinate system, corresponding to pixels stored in the frame buffer, respectively. According to the Z buffer algorithm, the game apparatus perspective projects all polygons on the screen in voluntary order. Herein, when perspective projecting any one of polygons on the screen, the game apparatus performs the following processing.

That is, in case Z values of pixels occupied by the perspective projected polygon are not stored in the Z buffer, the game apparatus stores the color of the point of the polygon corresponding to each pixel in the frame buffer, in the pixel of the frame buffer. On the other hand, in case Z values of pixels occupied by the polygon are stored in the Z buffer, the game apparatus compares the Z value of the point of the polygon corresponding to each pixel with the Z value of the pixel. Then, in case the Z value of the point of the polygon is smaller than the Z value of the pixel corresponding to the point, the game apparatus rewrites the Z value of the pixel to the Z value of the point, stores the Z value of the point in the Z buffer, and provides the color of the point to the pixel. On the other hand, in the case the Z value of the point of the polygon is larger than the Z value of the pixel corresponding to the point, the game apparatus does not rewrite the Z value of the pixel, and does not provide the color of the point to the pixel. When the game apparatus outputs values stored in the frame buffer after performing the above-described processing to each pixel, it is possible that the game apparatus performs the hidden surfaces processing to all polygons.

As another algorithm of the hidden surfaces processing, it is a back surfaces clipping algorithm. The back surfaces clipping algorithm is an algorithm of performing the hidden surfaces processing without perspective projecting all polygons. According to the back surfaces clipping algorithm, the game apparatus performs the following processing to each object provided in the virtual three-dimensional space.

That is, the game apparatus determines whether each polygon constituting the object is at the view point side (the front) of the object or the opposite side (the back) to the view point, on the basis of an eyes direction and direction of a normal of each polygon. More specifically, the game apparatus operates an angle between a normal vector of each polygon and an eyes vector, decides that the polygon is at the back in case the angle is an acute angle, and decides that the polygon is at the front in case the angle is an obtuse angle. Then, the game apparatus transforms only the polygons at the front to those represented in the screen coordinate system, and thereby determines the color of each pixel stored in the frame buffer. Therefore, because the game apparatus displays only the front of each object, it is possible that the game apparatus performs the hidden surfaces processing to all polygons.

By the way, in order to display more realistic images on a display screen, there is a case a transparent object or a translucent object such as a window glass or a water surface is provided in the virtual three-dimensional space. Hereinafter, the transparent object and the translucent object will be called a transparent object. The game apparatus displays the transparent object on the screen by performing the following processing.

That is, the game apparatus perspective projects the transparent object on the screen coordinate system, and determines colors of pixels corresponding to points included in each transparent polygon of the transparent object, according to an alpha value of the transparent object. More specifically, the game apparatus composes the color of each pixel decided before displaying the transparent polygon on the screen and the color of the transparent polygon, according to the alpha value, and thereby determines each pixel of the frame buffer. When the game apparatus performs the above-described processing to all transparent polygons constituting the transparent object, the transparent object is displayed on the screen.

In the game apparatus according to an earlier development, there are the following problems in case the game apparatus performs the hidden surfaces processing to the transparent polygon.

When the game apparatus carries out the hidden surfaces processing according to the Z buffer algorithm, because the game apparatus perspective projects all polygons in voluntary order, there is a case the display on the screen is influenced by the projection order. For example, in case another polygon is provided at the far side of the transparent polygon in the eyes direction, there is a difference in the display on the screen between the case the game apparatus perspective projects the transparent polygon first and the case the game apparatus perspective projects another polygon first.

That is, in case the game apparatus perspective projects the transparent polygon after perspective projecting another polygon first, because the Z value of the point included in the transparent polygon is smaller than the Z value of the pixel stored in the frame buffer, that is the Z value of the point included in another polygon, the game apparatus composes the color of the transparent polygon and the color of the frame buffer, that is the color of another polygon. Therefore, the images are displayed on the display screen so that another polygon is always at the far side of the transparent polygon. On the other hand, in case the game apparatus perspective projects another polygon after perspective projecting the transparent polygon first, because the Z value of the point included in another polygon is larger than the Z value of the pixel stored in the frame buffer, that is the Z value of the point included in the transparent polygon, the game apparatus does not provide the color of another polygon to the pixel. Therefore, in spite of the transparent polygon, the color of another polygon is not reflected in the transparent polygon on the display screen.

Further, according to the Z buffer algorithm, even if another object is not provided at the far side of the transparent object in the eyes direction, there is a difference in displaying the transparent object on the screen between the case the game apparatus perspective projects the front polygon constituting the transparent polygon after perspective projecting the back polygon and the case the game apparatus perspective projects the back polygon constituting the transparent polygon after perspective projecting the front polygon.

That is, in case the game apparatus perspective projects the front polygon of the transparent polygon after perspective projecting the back polygon first, because the Z value of the front polygon is smaller than the Z value of the pixel stored in the frame buffer, that is the Z value of the back polygon, the game apparatus composes the color of the front polygon and the color of the frame buffer. On the other hand, in case the game apparatus perspective projects the back polygon of the transparent polygon after perspective projecting the front polygon first, because the Z value of the back polygon is larger than the Z value of the pixel stored in the frame buffer, that is the Z value of the front polygon, the game apparatus does not provide the color of the back polygon to the pixel.

Therefore, concerning the transparent object, the game apparatus avoids that the projecting order of polygons has an influence on the display of the transparent object, by performing the hidden surfaces processing according to the back surfaces clipping algorithm.

However, according to the back surfaces clipping algorithm, because the color of the back polygon of the transparent polygon is not reflected on the display screen, there is a case the reality lacks. For example, in case the color of the back polygon of the transparent object is different from the color of the front polygon, the color of the back polygon is not reflected on the pixel. Accordingly, in spite of the transparent object, only the color of the front polygon of the transparent object is displayed on the display screen. Further, for example, in spite of the fact that the light is irradiated and reflected to the back of the transparent object, it is impossible that images are displayed on the display screen so that the light is reflected on the back of the transparent object.

SUMMARY OF THE INVENTION

The present invention was developed in view of the above-described problems.

It is an object of the present invention to reflect color data of back surfaces (far sides) of a plurality of transparent polygons overlapped with each other in an eyes direction, on a display screen.

In accordance with a first aspect of the present invention, a method for generating image data of a virtual three-dimensional space viewed from a predetermined view point, comprises:

determining (for example, a space operation unit 110 shown in FIG. 4) a plurality of transparent primitive surfaces in the virtual three-dimensional space;

operating (for example, a space operation unit 110 shown in FIG. 4) an angle between an eyes direction at the predetermined view point and a normal direction to each of the transparent primitive surfaces;

deciding (for example, a projection order decision unit 154 shown in FIG. 4) a description order of the plurality of transparent primitive surfaces so as to give priority one of the transparent primitive surfaces when the angle is an acute angle over one of the transparent primitive surfaces when the angle is an obtuse angle; and describing (for example, a perspective projection unit 156 shown in FIG. 4) the plurality of transparent primitive surfaces by composing color data of the transparent primitive surfaces in the description order.

According to the method of the first aspect of the present invention, it is possible to determine whether a front of each of the transparent primitive surfaces is turned to the view point or not, by operating the angle between the eyes direction and the normal direction of each of the transparent primitive surfaces.

For example, in case a plurality of transparent primitive surface constitute one object (model), the transparent primitive surface the front of which is not turned to the view point (Hereinafter, it will be called a back transparent primitive surface.) is a primitive surface constituting a back of the object, and the transparent primitive surface the front of which is turned to the view point (Hereinafter, it will be called a front transparent primitive surface.) is a primitive surface constituting a front of the object. In other words, basically, the front transparent primitive surface is positioned at the nearer side of the view point than the back transparent primitive surface.

Therefore, because when color data of the back transparent primitive surfaces are composed prior to the front transparent primitive surfaces, the back transparent primitive surfaces are described, the color data of the back transparent primitive surfaces are reflected on color data of the front transparent primitive surfaces, and the front transparent primitive surfaces are described. Accordingly, it is possible to express an image as the back transparent primitive surface is at the far side of the front transparent primitive surface. Consequently, for example, because it is possible to express an image as the reflection of light on the back transparent primitive surface is reflected on the front transparent primitive surface, it is possible to display the realistic image on a screen.

Herein, the primitive surface is a surface constituting a model (object). In case the model is a surface model, the primitive surface is at least one polygon constituting the model. Further, in case the model is a solid model, the primitive surface is a plane constituting a face of the model.

Preferably, the method according to the first aspect of the present invention, further comprises: deciding the description order of the plurality of transparent primitive surfaces so as to give priority one of the transparent primitive surfaces when the angle is an acute angle over another of the transparent primitive surfaces when the angle is an acute angle in order of far from the predetermined view point and so as to give priority one of the transparent primitive surfaces when the angle is an obtuse angle over another of the transparent primitive surfaces when the angle is an obtuse angle in order of far from the predetermined view point.

According to the above-described method, although there is a case a plurality of front transparent primitive surfaces are overlapped with each other in the eyes direction at some view point, because the plurality of front transparent primitive surfaces are described in order of far from the view point, one front transparent primitive surface is described with color data on which color data of another front transparent primitive surface at the far side of the one front transparent primitive surface are reflected. Consequently, it is possible to express an image as one front transparent primitive surface is at the far side of another front primitive surface.

In case a plurality of back transparent primitive surfaces are overlapped with each other in the eyes direction like the case of the front transparent primitive surfaces, it is possible to express an image as one back transparent primitive surface is at the far side of another back primitive surface.

In accordance with a second aspect of the present invention, a method for generating image data of a virtual three-dimensional space viewed from a predetermined view point, comprises:

determining (for example, a space operation unit 110 shown in FIG. 4) a plurality of transparent primitive surfaces in the virtual three-dimensional space;

deciding (for example, a projection order decision unit 154 shown in FIG. 4) a description order of the plurality of transparent primitive surfaces in order of far from the predetermined view point; and describing (for example, a perspective projection unit 156 shown in FIG. 4) the plurality of transparent primitive surfaces by composing color data of the transparent primitive surfaces in the description order.

According to the method of the second aspect of the present invention, because the description order of a plurality of transparent primitive surfaces is decided in order of far from the view point, color data of the plurality of transparent primitive surfaces are composed in the decided description order, and the transparent primitive surfaces are described, the transparent primitive surface at the near side in the eyes direction is described with color data on which color data of the transparent primitive surface at the far side in the eyes direction from the view point are reflected. Consequently, it is possible to express an image as one transparent primitive surface is at the far side of another transparent primitive surface. Further, because the description order of all transparent primitive surfaces is decided, even if a number of transparent primitive surfaces are overlapped in the eyes direction from the view point, the transparent primitive surface at the nearest side can be described with color data on which color data of the transparent primitive surface at the farthest side are reflected.

Preferably, the method according to the first aspect or the second aspect of the present invention, further comprises: describing a primitive surface other than the plurality of transparent primitive surfaces before describing the transparent primitive surfaces.

According to the above-described method, for example, in case a transparent primitive surface and a primitive surface (Hereinafter, it will be called a different primitive surface.) other than the transparent primitive surface are positioned in order and overlapped with each other, in the eyes direction from the view point, it will take the following effect. That is, because the different primitive surface is described first, the transparent primitive surface at the near side can be described with color data on which color data of the different primitive surface is reflected.

Preferably, the method as described above, further comprises: performing a predetermined hidden surfaces processing to the primitive surface other than the plurality of transparent primitive surfaces and the plurality of transparent primitive surfaces, and describing the transparent primitive surfaces.

According to the above-described method, for example, in case the different primitive surface and the transparent primitive surface are positioned in order and overlapped with each other, in the eyes direction from the view point, because the hidden surfaces processing is performed to the different primitive surface, even if the transparent primitive surface is to be described, it is impossible to described the transparent primitive surface.

Preferably, the method according to the first aspect or the second aspect of the present invention, further comprises:

deciding the description order so as to give priority an object including primitive surfaces other than the plurality of transparent primitive surfaces over an object including the plurality of transparent primitive surfaces, for every object; and describing the primitive surfaces other than the plurality of transparent primitive surfaces and the transparent primitive surfaces, for every object, in the description order.

According to the above-described method, because the description order of the transparent primitive surfaces and the different primitive surfaces is decided for every object, the processing of deciding the description order can be carried out faster than the processing of deciding the description order for every primitive surface the number of which is more than one of objects.

In accordance with a third aspect of the present invention, a method for generating image data of a virtual three-dimensional space viewed from a predetermined view point, comprises:

determining (for example, a space operation unit 110 shown in FIG. 4) a plurality of primitive surfaces including an opaque primitive surface and a plurality of transparent primitive surfaces in the virtual three-dimensional space;

deciding (for example, a projection order decision unit 154 shown in FIG. 4) a first description order of the plurality of primitive surfaces so as to give priority the opaque primitive surface over the plurality of transparent primitive surfaces;

operating (for example, a space operation unit 110 shown in FIG. 4) an angle between an eyes direction at the predetermined view point and a normal direction to each of the transparent primitive surfaces;

deciding (for example, a projection order decision unit 154 shown in FIG. 4) a second description order of the plurality of transparent primitive surfaces so as to give priority one of the transparent primitive surfaces when the angle is an acute angle over one of the transparent primitive surfaces when the angle is an obtuse angle; and performing (for example, a perspective projection unit 156 shown in FIG. 4) a hidden surfaces processing to the plurality of primitive surfaces according to a Z buffer algorithm, writing color data of the opaque primitive surface in a frame buffer (for example, a frame buffer 170 shown in FIG. 4), and writing color data composed of color data of each of the transparent primitive surfaces and the color data written in the frame buffer, in the frame buffer, in the first description order and the second description order.

According to the method of the third aspect of the present invention, it is possible to determine whether a front of each of the transparent primitive surfaces is turned to the view point or not, by operating the angle between the eyes direction and the normal direction of each of the transparent primitive surfaces.

For example, in case a plurality of transparent primitive surface constitute one object, a front transparent primitive surface constitutes one of a back of the object, and a back transparent primitive surface constitutes one of a front of the object. In other words, basically, the front transparent primitive surface is positioned at the nearer side of the view point than the back transparent primitive surface.

Further, on the basis of the first description order and the second description order, the order of the primitive surfaces is decided to be an order of the opaque primitive surface, the back transparent primitive surface and the front transparent primitive surface.

For example, in case of any one of (1) the opaque primitive surface, the front transparent primitive surface and the back transparent primitive surface are positioned and overlapped in order, (2) the front transparent primitive surface, the opaque primitive surface and the back transparent primitive surfaces are positioned and overlapped in order, and (3) the front transparent primitive surface , the back transparent primitive surface and the opaque primitive surface are positioned and overlapped in order, in the eyes direction from the view point, it is possible to display the realistic image on the screen.

That is, in case of (1), although color data of the opaque primitive surface is written in the frame buffer first, because the front transparent primitive surface and the back transparent primitive surface are hidden according to the Z buffer algorithm, color data of the front transparent primitive surface and the back transparent primitive surface are not composed to the color data written in the frame buffer. Accordingly, because the image is generated as the opaque primitive surface is at the nearest side of the view point, it is possible to display the realistic image on the screen.

Further, in case of (2), although color data of the opaque primitive surface is written in the frame buffer first, because the back transparent primitive surface is hidden according to the Z buffer algorithm, color data of the back transparent primitive surface are not composed to the color data written in the frame buffer. On the other hand, because the front transparent primitive surface is not hidden according to the Z buffer algorithm, color data of the front transparent primitive surface are composed to the color data written in the frame buffer, and the composed color data are written in the frame buffer. Accordingly, because the image is generated as the opaque primitive surface is at the far side of the front transparent primitive surface, it is possible to display the realistic image on the screen.

Further, in case of (3), although color data of the opaque primitive surface is written in the frame buffer first. Then, because the back transparent primitive surface is not hidden according to the Z buffer algorithm, color data of the back transparent primitive surface are composed to the color data written in the frame buffer, and the composed color data are written in the frame buffer. Then, because the front transparent primitive surface is not hidden according to the Z buffer algorithm, color data of the front transparent primitive surface are composed to the color data written in the frame buffer, and the composed color data are written in the frame buffer. Accordingly, because the image is generated as the back transparent primitive surface is at the far side of the front transparent primitive surface, and the opaque primitive surface is at the far side of the back transparent primitive surface, it is possible to display the realistic image on the screen.

In accordance with a fourth aspect of the present invention, a method for generating image data of a virtual three-dimensional space viewed from a predetermined view point, comprises:

determining (for example, a space operation unit 110 shown in FIG. 4) a plurality of primitive surfaces including an opaque primitive surface and a plurality of transparent primitive surfaces in the virtual three-dimensional space;

deciding (for example, a projection order decision unit 154 shown in FIG. 4) a first description order of the plurality of primitive surfaces so as to give priority the opaque primitive surface over the plurality of transparent primitive surfaces;

deciding (for example, a projection order decision unit 154 shown in FIG. 4) a second description order of the plurality of transparent primitive surfaces in order of far from the predetermined view point; and performing (for example, a perspective projection unit 156 shown in FIG. 4) a hidden surfaces processing to the plurality of primitive surfaces according to a Z buffer algorithm, writing color data of the opaque primitive surface in a frame buffer (for example, a frame buffer 170 shown in FIG. 4), and writing color data composed of color data of each of the transparent primitive surfaces and the color data written in the frame buffer, in the frame buffer, in the first description order and the second description order.

According to the method of the fourth aspect of the present invention, regarding the transparent primitive surface and the opaque primitive surface, the opaque primitive surface has priority over the transparent primitive surface on the description order, and a plurality of transparent primitive surfaces have priority in order of far from the view point on the description order. Consequently, even if a plurality of transparent primitive surfaces and the opaque primitive surface are positioned in any order in the eyes direction, it is possible to display the realistic image on the screen.

That is, for example, in case of any one of (1) the opaque primitive surface, a first transparent primitive surface and a second transparent primitive surface are positioned and overlapped in order, (2) the first transparent primitive surface, the opaque primitive surface and the second transparent primitive surfaces are positioned and overlapped in order, and (3) the first transparent primitive surface , the second transparent primitive surface and the opaque primitive surface are positioned and overlapped in order, in the eyes direction from the view point, it is possible to display the realistic image on the screen, like the case described in the third aspect of the present invention.

Preferably, the method of the first aspect or the second aspect of the present invention, further comprises:

determining (for example, a light sources determination unit 140 shown in FIG. 4) a light source in the virtual three-dimensional space;

operating (for example, a brightness operation unit 158 shown in FIG. 4) brightness of the transparent primitive surfaces on the basis of the light source; and deciding (for example, a RGBα value decision unit 160 shown in FIG. 4) color data of the transparent primitive surfaces on the basis of the brightness.

According to the above-described method, because the brightness of the transparent primitive surfaces are operated on the basis of the light source, and the color data of the transparent primitive surfaces are decided on the basis of the brightness, for example, it is possible to express an image as light is reflected on the transparent primitive surface by bringing the color data of the transparent primitive surface into white color. Consequently, it is possible to display the more realistic image on the screen.

Preferably, the method of the first aspect or the second aspect of the present invention, further comprises: determining at least one of the transparent primitive surfaces to be at least one portion of a predetermined vehicle object or a predetermined plane object in the virtual three-dimensional space.

According to the above-described method, because at leas one of the transparent primitive surfaces is determined to be at least one portion of the vehicle object or the plane object, it is possible to express a window glass of the vehicle object or the plane object as the transparent primitive surface. Further, as described above, it is possible to express an image as one transparent primitive surface is at the far side of another transparent primitive surface, that is one window glass is at the far side of another window glass. Consequently, it is possible to generate the more realistic images of the vehicle object and the plane model.

In accordance with a fifth aspect of the present invention, a method for generating image data of a virtual three-dimensional space viewed from a predetermined view point, comprises:

composing color data of one of a plurality of transparent surfaces determined in the virtual three-dimensional space and color data of another of the transparent surfaces, to describe the transparent surfaces.

According to the method of the fifth aspect of the present invention, for example, in case one transparent surface is overlapped with another transparent surface in the eyes direction from the view point in the virtual three-dimensional space, because color data of the one transparent surface is composed to color data of the another transparent surface, it is possible to express an image as the another transparent surface is at the far side of the one transparent surface. Consequently, for example, because it is possible to generate an image as light reflected on the another transparent surface is reflected on the one transparent surface, it is possible to display the realistic image on the screen.

Preferably, the method of the first aspect or the second aspect of the present invention, performed on a game apparatus (for example, a game apparatus shown in FIG. 1), further comprises:

executing a predetermined game; and generating game image data of the predetermined game, comprising the image data of the virtual three-dimensional space.

In accordance with a sixth aspect of the present invention, an apparatus is adapted to carry out the method as described above.

In accordance with a seventh aspect of the present invention, a storage medium has a program recorded thereon, when the program is loaded onto an operating apparatus, the program making the operating apparatus execute the method as described above.

In accordance with a eighth aspect of the present invention, a program, when the program is loaded onto an operating apparatus, makes the operating apparatus execute the method as described above.

In accordance with a ninth aspect of the present invention, a program product comprises a storage medium having a program recorded thereon, when the program is loaded onto an operating apparatus, the program making the operating apparatus execute the method as described above.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENTS OF THE INVENTION

Hereinafter, a preferred embodiment of the present invention will be explained with reference to figures, as follows.

Although it will be explained that the present invention is applied to a flight game, as an example, it should be understood that the present invention is not limited to the flight game.

Figure 1:
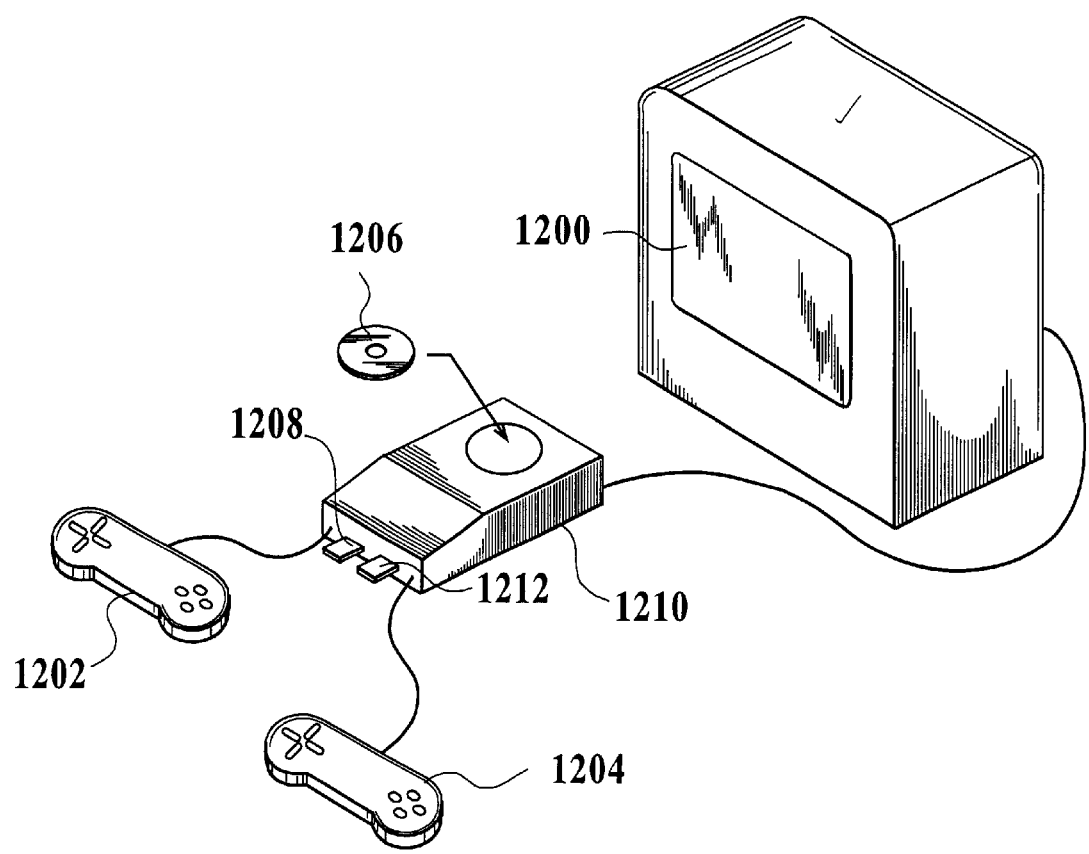
FIG. 1 is a view showing an exemplary case the present invention is applied to a consumer game machine.

FIG. 1 is a view showing an exemplary case the present invention is applied to a consumer game machine.

As shown in FIG. 1, game controllers 1202 and 1204, a display 1200, and a speaker which is not shown in figures are connected to a game apparatus body 1210. Further, data for playing a game such as a game program and so on, are stored on a CD-ROM 1206, an IC card 1208, a memory card 1212 or the like, as a data storage medium attachable to and detachable from the game apparatus body 1210.

Therefore, with watching game images displayed on the display 1200, a player controls the game controller 1202 or 1204, and enjoys playing the flight game of piloting a virtual plane.

Figure 2:
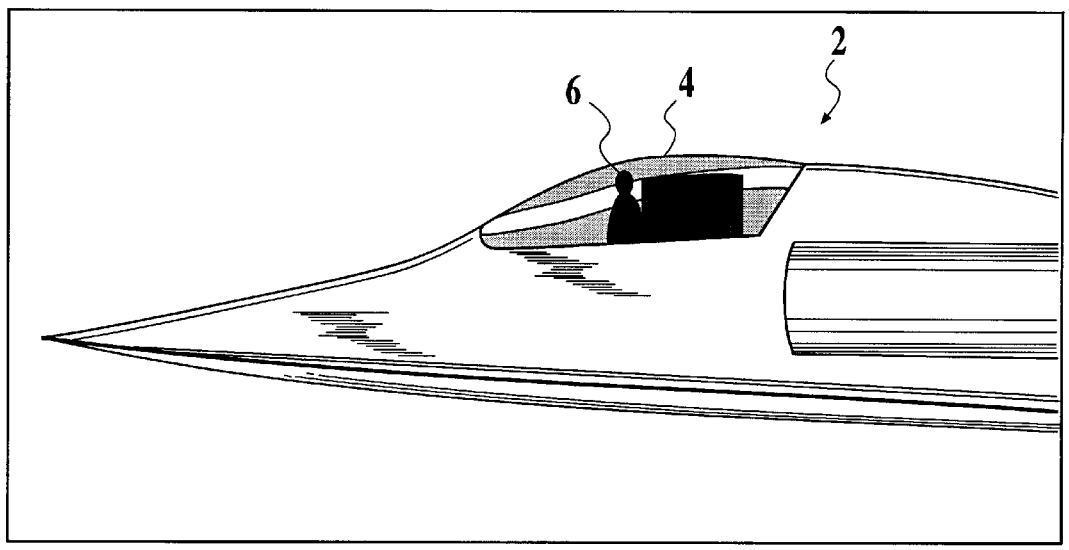
FIG. 2 is an exemplary game screen of a game apparatus according to the present invention.
Figure 3:
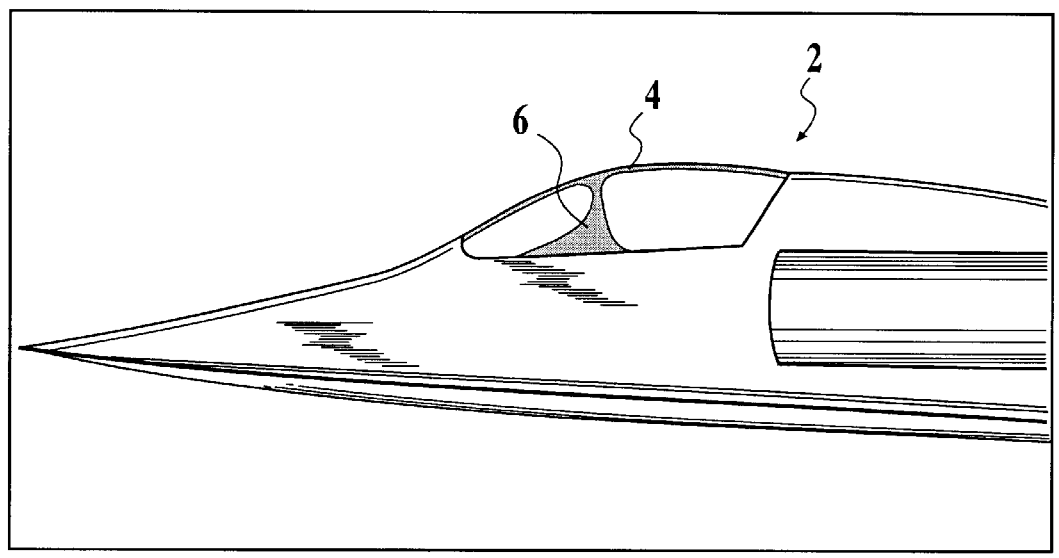
FIG. 3 is an exemplary game screen of the game apparatus according to the present invention.

FIGS. 2 and 3 are exemplary screens displayed on the display 1200 while the flight game is played.

FIG. 2 is a screen showing an exemplary case a light is irradiated to a plane 2 from a far side of the screen. FIG. 3 is a screen showing an exemplary case a light is irradiated to the plane 2 from a near side of the screen.

On the screens shown in FIGS. 2 and 3, in common with each other, the plane 2 and a canopy 4 of the plane 2 are displayed.

On the screen shown in FIG. 2, because the light is irradiated to the plane 2 from the far side of the screen, the light is reflected on a far portion of the canopy 4. Therefore, on the screen shown in FIG. 2, a cockpit and a pilot 6 inside of the canopy 4 are displayed distinctly. On the other hand, on the screen shown in FIG. 3, because the light is irradiated to the plane 2 from the near side of the screen, the light is reflected on a near portion of the canopy 4. Therefore, on the screen shown in FIG. 3, the cockpit and the pilot 6 inside of the canopy 4 are not displayed distinctly.

As described above, the game apparatus according to the embodiment of the present invention, is suitable to realistically display a transparent or translucent object such as the canopy 4 and so on, on the screen. Hereinafter, a functional structure and a processing necessary to display as described above will be explained.

Figure 4:
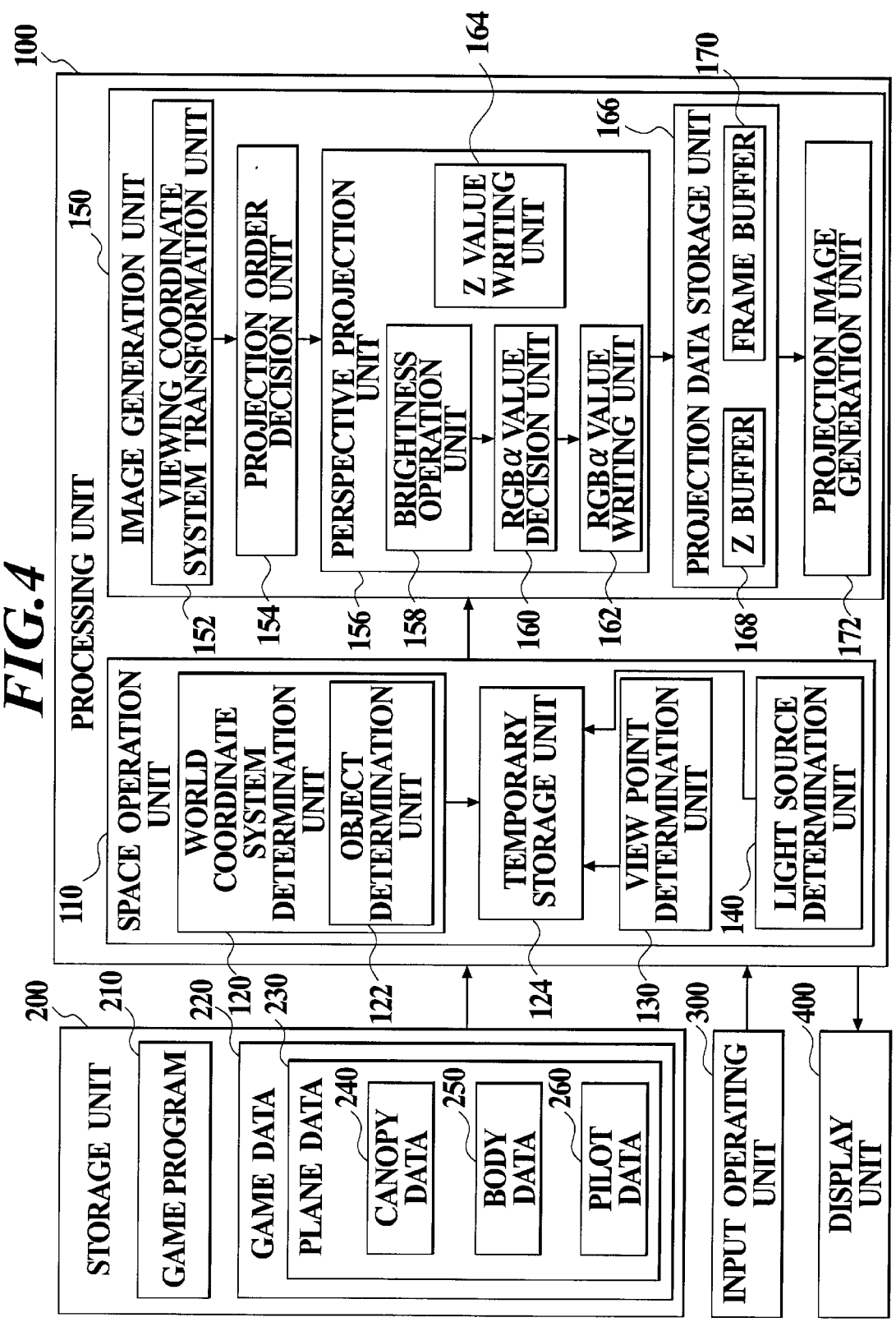
FIG. 4 is a functional block diagram of the game apparatus according to the present invention.

FIG. 4 is a functional block diagram of the game apparatus according to the embodiment of the present invention.

The functional block of the game apparatus comprises a processing unit 100, a storage unit 200, an input operating unit 300, and a display unit 400.

The input operating unit 300 corresponds to the game controllers 1202 and 1204 shown in FIG. 1. The input operating unit 300 has a structure capable of operating various types of inputs according to the type or the content of the game. The input operating unit 300 outputs an operation signal according to that a player operates the input operating unit 300, to the processing unit 100.

Herein, in case the game apparatus according to the embodiment is an arcade game machine, the input operating unit 300 corresponds to a game controller, a joy-stick, push buttons or the like. On the other hand, the game apparatus is a computer system including a personal computer, a general computer and so on, the input operating unit 300 corresponds to a keyboard, a mouse pointer, a joystick, a particular game controller or the like.

The processing unit 100 is contained in the game apparatus body 1210 shown in FIG. 1. That is, the processing unit 100 corresponds to a device comprising a CPU, a RAM, a ROM, an image generation chip, a system bus for connecting the above-described units to each other, and so on. Further, the processing unit 100 controls the whole game apparatus. That is, the processing unit 100 receives the operation signal outputted from the input operating unit 300. Further, the processing unit 100 outputs a display signal to the display unit 400. Furthermore, the processing unit 100 reads data stored in the storage unit 200, therein.

The display unit 400 corresponds to the display 1200 shown in FIG. 1. The display unit 400 is a device for displaying images according to the display signal outputted from the processing unit 100, thereon.

The storage unit 200 corresponds to the CD-ROM 1206, the IC card 1208, and the memory card 1212 shown in FIG. 1. Herein, the storage unit 200 may be a data storage medium such a game cassette, a DVD, a MO, a flexible disc, a hard disc or the like.

The storage unit 200 comprises a game program 210 and a game data 220 stored therein. The game program 210 is data so that the processing unit 100 comprises various functions for carrying out the game. The game data 220 is data necessary for the processing unit 100 to progress the game.

The processing unit 100 reads out the game program 210 from the storage unit 200, performs a processing on the basis of the game program 210, and thereby carries out the game for a player to pilot a virtual plane. Therefore, the processing unit 100 achieves various types of functions for carrying out the game by performing the processing on the basis of the game program 210.

The processing unit 100 comprises a space operation unit 110 and an image generation unit 150, as a functional block thereof. The space operation unit 110 operates coordinates concerning a virtual three-dimensional space. The image generation unit 150 generates images viewed from a predetermined view point in the virtual three-dimensional space operated by the space operation unit 110. The images generated by the image generation unit 150 are displayed on the display unit 400.

The space operation unit 110 comprises a world coordinate system determination unit 120, a view point determination unit 130, a light source determination unit 140, and a temporary storage unit 124.

Figure 5:
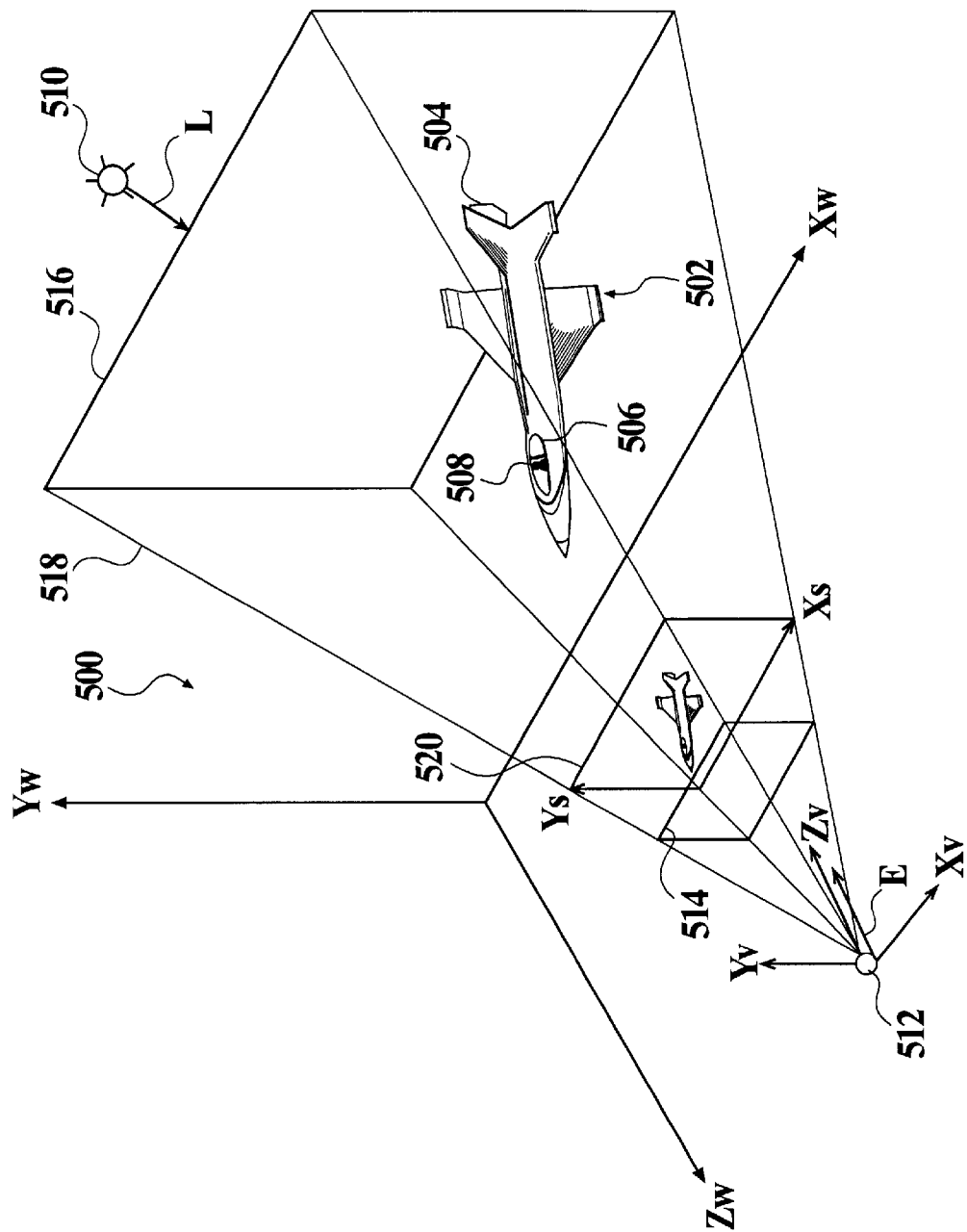
FIG. 5 is a view for explaining a compositing principle of a game image of the game apparatus according to the present invention.

Hereinafter, the world coordinate system determination unit 120, the view point determination unit 130, the light source determination unit 140 and the temporary storage unit 124 will be explained with reference to FIG. 5, in detail. FIG. 5 is a view showing a coordinate system of a virtual three-dimensional space 500.

The world coordinate system determination unit 120 is a unit for representing the virtual three-dimensional space 500 shown in FIG. 5 in the world coordinate system (Xw, Yw, Zw). The world coordinate system determination unit 120 comprises an object determination unit 122.

The object determination unit 122 determines vertexes of each polygon, the position and the direction of each object consisting of a plurality of objects, and the position and the direction of each object set consisting of a plurality of objects, by coordinate values in the world coordinate system. That is, the object determination unit 122 performs a processing of arranging objects and object sets in the virtual three-dimensional space represented in the world coordinate system.

For example, according to the flight game of the embodiment, the object set is a plane model 502. The object includes a body model 504, a canopy model 506 and a pilot model 508, for constituting the plane model 502. Besides the above-described models, the object set or the object includes models representing an environmental background such as geographical features, buildings, vehicles and so on.

The object set has a hierarchical structure of objects. Therefore, in case the object determination unit 122 determines the position and the direction of the object set, the positions and the directions of objects constituting the object set are influenced by the position and the direction of the object set.

The object set will be explained, in the case of the plane model 502 as an example. The game data 220 includes plane data 230 concerning the plane model 502. Further, the plane data 230 includes canopy data 240 concerning the canopy model 506, body data 250 concerning the body model 504, and pilot data 260 concerning the pilot model 508.

The canopy data 240, the body data 250 and the pilot data 260 include polygon coordinate value data for representing coordinate values of vertexes of each polygon constructing each model in each local coordinate system, and color data (texture data mapped on each model, data for representing colors of vertexes of each polygon, and so on) of each model. The plane data 230 includes data for determining a relative position relation and a relative direction relation among the canopy model 506, the body model 504 and the pilot model 508.

Therefore, when the object determination unit 122 determines a representative point of the plane model 502 in the virtual three-dimensional space 500 represented in the world coordinate system, the object determination unit 122 transforms coordinate values of vertexes of polygons constituting the body model 504, the canopy model 506 and the pilot model 508 to those represented in the world coordinate system, and determines coordinate values of representative points of the body model 504, the canopy model 506 and the pilot model 508 in the world coordinate system. Thereby, the plane model 502 is provided in the virtual three-dimensional space 500.

Herein, the canopy data 240 includes an identifier for identifying the canopy model 506 as a transparent object. On the other hand, each of the body data 250 and the pilot data 260 includes an identifier for identifying each model as an opaque object. Thereby, polygons constituting the canopy model 506 are identified as a transparent polygon, and polygons constituting the body model 504 and the pilot model 508 are identified as an opaque polygon.

Further, the world coordinate system determination unit 120 performs a processing of operating a direction of a normal of each polygon on the basis of coordinate values of vertexes of each polygon represented in the world coordinate system.

For example, in case each polygon is a triangle polygon consisting of three vertexes, three vertexes of each polygon are represented in clockwise order. In case coordinate values of vertexes of a polygon are $P_1=(x_1, y_1, z_1)$, $P_2=(x_2, y_2, z_2)$, and $P_3=(x_3, y_3, z_3)$, the normal vector of the polygon; $N=(n_x, n_y, n_z)$ is represented in the following vector product equation (1).

$$N=(P_3-P_2)\times(P_2-P_1) \quad (1)$$

$$n_x=(y_2-y_1)(z_3-z_2)-(z_2-z_1)(y_3-y_2)$$

$$n_y=(z_2-z_1)(x_3-x_2)-(x_2-x_1)(z_3-z_2)$$

$$n_z=(x_2-x_1)(y_3-y_2)-(y_2-y_1)(x_3-x_2)$$

Further, the world coordinate system determination unit 120 performs a processing of operating a normal vector of each vertex of each polygon. The normal vector of each vertex is the average of normal vectors of all polygons adjacent to the vertex.

For example, in case normal vectors of polygons adjacent to a vertex are $N_1, N_2, \ldots, N_m$, the normal vector $N_P$ of the vertex is represented in the following equation (2). Herein, "m" is the number of polygons adjacent to the vertex.

$$N_P=(N_1+N_2+\ldots+N_m)/m \quad (2)$$

The results determined by the world coordinate system determination unit 120, that is, the coordinate values of vertexes represented in the world coordinate system, the normal vectors of polygons, the normal vectors of vertexes, the representative points of objects and the object set, and so on, are stored in the temporary storage unit 124 temporarily.

The light source determination unit 140 is a unit for determining a light source 510 in the virtual three-dimensional space 500 represented in the world coordinate system, on the basis of the game data 220. That is, the light source determination unit 140 determines a light vector L and a light intensity $I_L$ of the light source 510. The light vector L and the light intensity $I_L$ determined by the light source determination unit 140 are stored in the temporary storage unit 124 temporarily. Herein, although it will be explained that the light source 510 described as follows is a parallel light source, the light source 510 may be a point light source or a spot light source.

The view point determination unit 130 is a unit for determining a position of a view point 512 (an origin of an eyes vector) and an eyes direction (an eyes vector E) from the view point 512 in the virtual three-dimensional space 500 represented in the world coordinate system.

Herein, in case the plane model 502 is a model controlled by a player, the object determination unit 122 moves the plane model 502 in the virtual three-dimensional space 500 on the basis of the operation signal outputted from the input operating unit 300. Then, the view point determination unit 130 determines a virtual spring between the plane model 502 controlled by the player and the view point 512. Thereby, the view point determination unit 130 determines the view point 512 so as to follow the plane model 502 controlled by the player. The position of the view point 512 and the eyes direction determined by the view point determination unit 130 are stored in the temporary storage unit 130 temporarily.

As described above, the results operated and determined by each unit included in the space operation unit 110 are outputted to the image generation unit 150.

That is, the image generation unit 150 generates images of the virtual three-dimensional space 500 on the basis of data concerning coordinate values and so on stored in the temporary storage unit 124 and color data stored in the game data 220. The image generation unit 150 comprises a viewing coordinate system transformation unit 152, a projection order decision unit 154, a perspective projection unit 156, a projection data storage unit 166, and a projection image generation unit 172.

The viewing coordinate system transformation unit 152 transforms coordinate values of vertexes represented in the world coordinate system, normal vectors of polygons, normal vectors of vertexes, the light vector L of the light source 510, representative points of objects and object sets, and so on, to those represented in the viewing coordinate system $(X_V, Y_V, Z_V)$, on the basis of the position and the direction of the view point 512.

More specifically, the viewing coordinate system transformation unit 152 performs the coordinate transformation of determining that the view point 512 is an origin in the viewing coordinate system and the direction of the view point 512 is a $Z_V$ axis in the viewing coordinate system (the eyes vector E is parallel to the $Z_V$ axis). Further, the viewing coordinate system transformation unit 152 performs a clipping processing, and thereby limits the polygon and the vertex as a target of the perspective projection processing carried out by the perspective projection unit 156. That is, the viewing coordinate system transformation unit 152 performs the perspective projection processing to polygons and vertexes provided in a view volume (frustum) 518 determined by a near clipping plane 514 and a far clipping plane 516 perpendicular to the eyes of the view point 512.

The projection order decision unit 154 decides the projection order of objects and polygons perspective projected by the perspective projection unit 156.

The perspective projection unit 156 perspective projects objects and polygons on a screen 520 in the projection order decided by the projection order decision unit 154, and describes the objects on the screen 520.

The projection data storage unit 166 stores the images described on the screen 520 therein.

The projection image generation unit 172 generates the images stored in the projection data storage unit 166. The images generated by the projection image generation unit 172 are displayed on the display unit 400.

The above-described processing will be explained in detail, as follows.

First, the projection order decision unit 154 decides the projection order of a plurality of objects according to identifiers of data concerning the objects (for example, the canopy data 240 concerning the canopy model 506). That is, the projection order decision unit 154 sorts the plurality of object into two according to the identifiers thereof, so as to give priority to the opaque object over the transparent object in the projection order. For example, regarding the plane model 502, the body model 504 and the pilot model 508 are given priority over the canopy model 506 in the projection order. Thereby, all opaque polygons are given priority over all transparent polygons in the projection order.

Herein, in case a plurality of opaque objects are provided in the virtual three-dimensional space, the projection order decision unit 154 decides the projection order of opaque objects voluntarily without sorting the plurality of opaque objects.

Further, in case each opaque object consists of a plurality of polygons, the projection order decision unit 154 decides the projection order of polygons without sorting the plurality of polygons.

On the other hand, in case a plurality of transparent objects are provided in the virtual three-dimensional space, the projection order decision unit 154 sorts the plurality of transparent objects according to Z values ($Z_V$ coordinate values in the viewing coordinate system; the larger the Z value is, the farther the transparent object is from the view point in the eyes direction) of representative points of transparent objects in the screen coordinate system, and decides the projection order of transparent objects. That is, the projection order decision unit 154 sorts the plurality of transparent objects in order of Z value by comparing Z values of transparent objects with each other, and decides the projection order of transparent objects.

Further, in case each transparent object consists of a plurality of polygons, the projection order decision unit 154 sorts the polygons into two of polygons constituting the front (the near side in the eyes direction) of each transparent object and polygons constituting the back (the far side in the eyes direction) of each transparent. Then, the projection order decision unit 154 gives priority to the polygons constituting the back over the polygons constituting the front in the projection order.

More specifically, the projection order decision unit 154 calculates the angle between the normal vector N of each polygon and the eyes vector E. Then, the projection order decision unit 154 sorts the plurality of polygons into the polygon when the angle is an obtuse angle and the polygon when the angle is an acute angle. Then, the projection order decision unit 154 gives priority to the polygon with the acute angle over the polygon with the obtuse angle in the projection order.

Herein, the polygon with the obtuse angle is one of polygons constituting the front of each object, and the polygon with the acute angle is one of polygons constituting the back of each object.

Further, whether the angle between the normal vector and the eyes vector is an obtuse angle or an acute angle, is decided by a scalar product of the normal vector N and the eyes vector E. That is, when an answer of the following equation (3) representing the scalar product is a positive, the polygon constitutes the front of the object, and when the answer is a negative, the polygon constitutes the back of the object.

$$-E \cdot N \qquad (3)$$

Further, regarding a plurality of polygons constituting the back of each transparent object, the projection order decision unit 154 voluntary decides the projection order of each polygon without sorting the plurality of polygons. Like the above-described case, regarding a plurality of polygons constituting the front of each transparent object, the projection order decision unit 154 voluntary decides the projection order of each polygon without sorting the plurality of polygons.

The perspective projection unit 156 transforms polygons to those represented in the screen coordinate system (Xs, Ys), in the decided projection order, and decides colors of pixels of the screen 520 included in polygons.

Figure 6A:
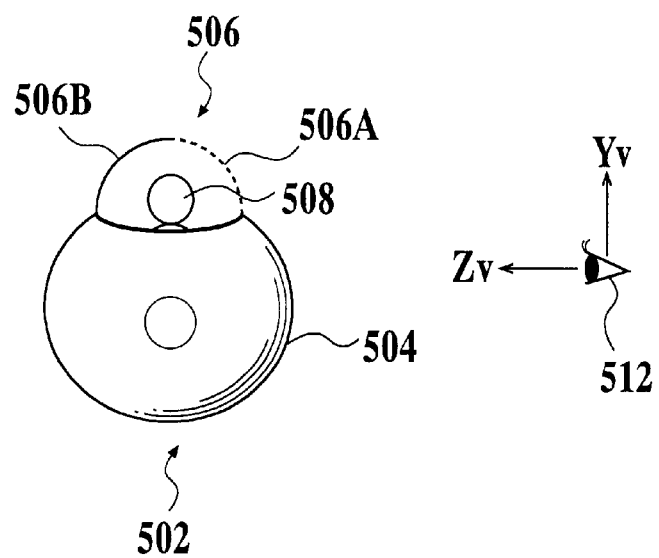
FIGS. 6A and 6B are views for explaining the compositing principle of the game image of the game apparatus according to the present invention.

For example, according to the plane model 502, as shown in FIG. 6A, the perspective projection unit 156 transforms a plurality of opaque polygons constituting the body model 504 and the pilot model 508 to those represented in the screen coordinate system in order, and decides colors of pixels of the screen 520 included in the transformed polygons.

Then, the perspective projection unit 156 transforms a plurality of transparent polygons constituting the back portion 506B of the canopy model 506 to those represented in the screen coordinate system in order, and decides colors of pixels of the screen 520 included in the transformed polygons.

Then, the perspective projection unit 156 transforms a plurality of transparent polygons constituting the front portion 506A shown on a dotted line of the canopy model 506 to those represented in the screen coordinate system in order, and decides colors of pixels of the screen 520 included in the transformed polygons.

Figure 6B:
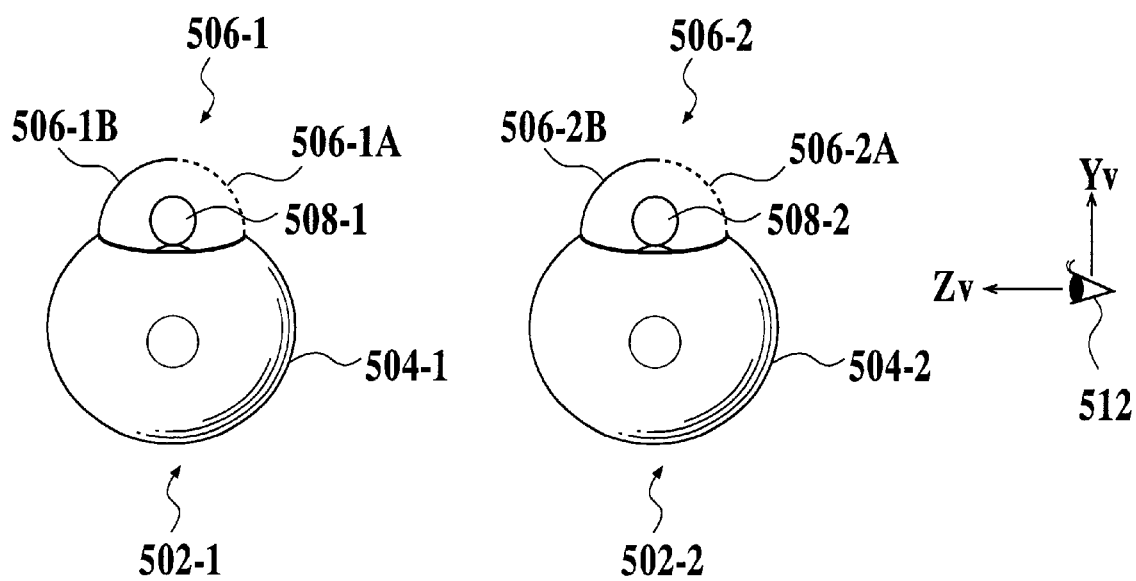

Further, as shown in FIG. 6B, in case two plane models are in the virtual three-dimensional space, the perspective projection unit 156 projects and describes a plane model 502-1 at the far side in the eyes direction and a plane model 502-2 at the near side in the eyes direction, in the following order.

That is, (1) the perspective projection unit 156 projects and describes a plurality of opaque polygons constituting body models 504-1 and 504-2 and pilot models 508-1 and 508-2 in order. Then, (2) the perspective projection unit 156 projects and describes a plurality of transparent polygons constituting a back portion 506-1B of a far canopy model 506-1 in order. Then, (3) the perspective projection unit 156 projects and describes a plurality of transparent polygons constituting a front portion 506-1A shown on a dotted line of the far canopy model 506-1 in order. Then, (4) the perspective projection unit 156 projects and describes a plurality of transparent polygons constituting a back portion 506-2B of a near canopy model 506-2 in order. Then, (5) the perspective projection unit 156 projects and describes a plurality of transparent polygons constituting a front portion 506-2A shown on a dotted line of the near canopy model 506-2.

Even if not less than three plane models are in the virtual three-dimensional space, the perspective projection unit 156 performs the processing like the above-described processing.

That is, the perspective projection unit 156 projects and describes a plurality of opaque polygons constituting body models and pilot models of all plane models in order, and then projects and describes a plurality of canopy models in order of far. Regarding each canopy, the perspective projection unit 156 projects and describes a plurality of transparent models constituting the back portion of each canopy model in order, and then projects and describes a plurality of transparent models constituting the front portion of each canopy model in order.

Further, in case a plurality plane models are in the virtual three-dimensional space, the projection order decision unit 154 may decide the projection order as follows.

The projection order decision unit 154 gives priority to a plurality of plane models in order of Z values of representative points of plane models. Further, regarding each plane model, the projection order decision unit 154 gives priority to polygons in order of polygons constituting the body model and the pilot model, polygons constituting the back portion of the canopy, and polygons constituting the front portion of the canopy.

Therefore, in case shown in FIG. 6B, the projection order decision unit 154 decides the projection order as follows, and the perspective projection unit 156 projects and describes polygons in the decided order.

That is, (1) the perspective projection unit 156 projects and describes a plurality of opaque polygons constituting the plane model 504-1 and the pilot model 508-1 in order. Then, (2) the perspective projection unit 156 projects and describes a plurality of transparent polygons constituting the back portion 506-1B of the far canopy model 506-1 in order. Then, (3) the perspective projection unit 156 projects and describes a plurality of transparent polygons constituting the front portion 506-1A shown on a dotted line of the far canopy model 506-1 in order. Then, (4) the perspective projection unit 156 projects and describes a plurality of opaque polygons constituting the body model 504-2 and the pilot model 508-2 in order. Then, (5) the perspective projection unit 156 projects and describes a plurality of transparent polygons constituting the back portion 506-2B of the near canopy model 506-2 in order. Then, (6) the perspective projection unit 156 projects and describes a plurality of transparent polygons constituting the front portion 506-2A shown on a dotted line of the near canopy model 506-2. Projecting and describing a plurality of polygons in the above-described projection order, the perspective projection unit 156 projects and describes polygons for every plane model.

Further, the perspective projection unit 156 processes polygons by the hidden surfaces processing according to the Z buffer algorithm, and thereby describes the polygons on the screen 520. The hidden surfaces processing will be explained in detail, as follows.

The projection data storage unit 166 comprises a Z buffer 168 and a frame buffer 170. The Z buffer 168 is an area in which the Z value of each pixel of the screen 520 is stored temporarily. The frame buffer 170 is an area in which color data (a R value, a G value, a B value and an α value) of each pixel of the screen 520 are stored temporarily. Hereinafter, the R value, the G value, the B value and the α value will be called a RGBα value. Each of the R value, the G value, and the B value has a range from 0 to 255. The α value has a range from 0 to 1.

The perspective projection unit 156 stores the RGBα value of the color of the background for every pixel of the screen 520 in the frame buffer 170, and the Z value of the infinite for every pixel of the screen 520 in the Z buffer 168, before perspective projecting polygons. Then, the perspective projection unit 156 perspective projects polygons in order decided by the projection order decision unit 154. Herein, the perspective projection unit 156 carries out the following processing, when perspective projecting one polygon.

That is, the perspective projection unit 156 operates and interpolates Z values of internal points of the polygon on the basis of Z values ($Z_v$ value which is called a depth value in the viewing coordinate system) of vertexes constituting the polygon. Like the case of operating and interpolating the Z values, the perspective projection unit 156 operates and interpolates RGBα values of internal points of the polygon on the basis of RGBα values of vertexes constituting the polygon.

Then, the perspective projection unit 156 compares the Z value of each pixel stored in the Z buffer 168 with the Z value of the point of the polygon corresponding to each pixel, for every pixel included in the polygon.

Then, in case the Z value of the pixel is larger than the Z value of the point of the polygon, the perspective projection unit 156 provides the RGBα value and the Z value of the point of the polygon, to the pixel. Herein, if the polygon is a transparent polygon, the perspective projection unit 156 composes the RGBα value of the pixel and the RGBα value of the point. The Z value provided to the pixel is stored in the Z buffer 168, and the RGBα value provided or composed to the pixel is stored in the frame buffer 170.

A Z value writing unit 164 included in the perspective projection unit 156 writes the Z value in the Z buffer 168. Further, a RGBα value writing unit 162 included in the perspective projection unit 156 writes the RGBα value in the frame buffer 170.

As described above, when the perspective projection unit 156 perspective projects all polygons included in the view volume 518 in order, the polygons are processed by the hidden surfaces processing, and images of the virtual three-dimensional space 500 viewed from the view point 512 are described on the screen 520.

Further, the conventional Z buffer algorithm means to perspective project a plurality of polygons in the voluntary order, perform the hidden surfaces processing to the polygons by comparing Z values of pixels with Z values of points of polygons, and describe images. However, the Z buffer algorithm according to the embodiment means to perform the hidden surface processing to one polygon by comparing Z values of pixels with Z values of points of the polygon as described above, and store RGBα values and Z values.

The perspective projection unit 156 performs the shading processing to the object, and describes the object processed by the shading processing on the screen 520. Further, the perspective projection unit 156 performs the translucent compositing processing to the color of the transparent object when describing the transparent object on the screen 520.

The above-described processing will be explained in detail. The perspective projection unit 156 comprises a brightness operation unit 158 for operating the brightness of the polygon which is projected and a RGBα value decision unit 160 for deciding the RGBα value of the polygon which is projected on the basis of brightness.

The brightness of the polygon will be operated as follows. That is, the brightness operation unit 158 operates the brightness of each of vertexes constituting the polygon which is projected. The brightness $I_P$ of the vertex will be operated by the following equation (4).

$$I_P = -K_P I_L (N_P \cdot L)/(N_P^2 L^2)^{1/2} \quad (4)$$

Herein, the $K_P$ is a reflex coefficient of the vertex, and is basically determined for every object.

Then, the brightness operation unit 158 operates and interpolates the brightness I of the internal point of the polygon on the basis of the brightness $I_P$ of a plurality of vertexes constituting the polygon. The above-described processing is called a Gouraud shading or a Phong shading.

The color of the polygon is decided as follows. That is, the RGBα value decision unit 160 reads the color data (texture data mapped on the object and data interpolated on the basis of color data of vertexes of the polygon) of the internal point of the polygon which is perspective projected and included in the game data 220. Then, the RGBα value decision unit 160 adds the brightness I operated by the brightness operation unit 158 to the R value, the G value, the B value and the α value of the RGBα value of the internal point of the polygon.

For example, the $R_P$ value, the $G_P$ value, the $B_P$ value and the $α_P$ value of the internal point of the polygon are expressed on the following equation (5).

$$R_P=R_d+I,\ G_P=G_d+I,\ B_P=B_d+I,\ α_P=α_d+I/255 \tag{5}$$

Herein, the $R_d$ value, the $G_d$ value, the $B_d$ value, and the $α_d$ value are color data of the internal point of the polygon included in the game data 220. Further, in case each of the $R_P$ value, the $G_P$ value and the $B_P$ value is over 255, it is fixed on 255, and in case each of the $R_P$ value, the $G_P$ value and the $B_P$ value is under 0, it is fixed on 0. Further, in case the $α_P$ is over 1, it is fixed on 1, and in case the $α_P$ is under 0, it is fixed on 0.

As described above, as indicated in the equation (4), in case the angle between the normal vector of the vertex and the light vector L is an obtuse angle, the brightness $I_P$ becomes a positive value, and in case the angle is an acute angle, the brightness $I_P$ becomes a negative value. Further, in case the angle between the normal vector and the light vector is an obtuse angle, the more the angle increases from 90 degrees to 180 degrees, the larger the absolute value of the brightness $I_P$ is, in case the angle is an acute angle, the lesser the angle is decreases from 90 degrees to 0 degree, the larger the absolute value of the brightness $I_P$ is, and in case the angle is 90 degrees, the brightness $I_P$ is 0.

Further, as indicated in the equation (5), the color data of the polygon, that is, the R value, the G value, and the B value are influenced by the light source 510. That is, the higher the brightness of the vertex is, the larger the R value, the G value and the B value of the internal point of the polygon are.

Then, the translucent compositing processing will be explained. As described above, the RGBα value writing unit 162 provides the new RGBα value to the pixel and describes the polygon, in case the Z value of the pixel is larger than the Z value of the point included in the polygon when the polygon is perspective projected in the screen coordinate system. Herein, the RGBα value writing unit 162 carried out the different processing between the case of describing the opaque polygons constituting the opaque object and the case of describing the transparent polygons constituting the transparent object.

In case of describing the opaque polygons constituting the opaque object, the RGBα value writing unit 162 carries out the following processing.

When the opaque polygons are perspective projected in the screen coordinate system, in case the Z value of the pixel is larger than the Z value of the point included in the opaque polygon corresponding to the pixel, the RGBα value writing unit 162 provides the RGBα value of the point to the pixel.

That is, in case of the opaque polygons of the opaque object, the RGBα value writing unit 162 rewrites the RGBα value stored in the frame buffer 170 to the RGBα value of the point. Thereby, the opaque polygons are processed by the hidden surfaces processing and described on the screen 520. Herein, in case the RGBα value stored in the frame buffer 170 is rewritten, the Z value writing unit 164 rewrites the Z value stored in the Z buffer 168 to the Z value of the point.

On the other hand, in case of describing the transparent polygons constituting the transparent object, the RGBα value writing unit 162 carries out the following processing.

When the transparent polygons are perspective projected in the screen coordinate system, in case the Z value of the pixel is larger than the Z value of the point of the transparent polygon corresponding to the pixel, the RGBα value writing unit 162 determines the RGBα value by the equation (6) on the basis of the RGBα value of the pixel and the RGBα value of the point, and provides the determined RGBα value to the pixel.

$$R=R_S(1-α_P)+R_Pα_P$$
$$G=G_S(1-α_P)+G_Pα_P$$
$$B=B_S(1-α_P)+B_Pα_P \tag{6}$$

Herein, the $R_S$ value, the $G_S$ value, and the $B_S$ value are the RGB value of the pixel before the polygon is projected, that is the RGB value stored in the frame buffer 170. The $R_P$ value, the $G_P$ value, the $B_P$ value, and the αp value are the RGBα value of the point included in the polygon, that is the RGBα value decided by the RGBα value decision unit 160.

That is, in case of the polygons of the transparent object, the RGBα value writing unit 162 composes the $R_SG_SB_S$ value stored in the frame buffer 170 and the $R_PG_PB_Pα_P$ value in the compositing ratio according to the $α_P$ value. Then, in case the Z value of the pixel is larger than the Z value of the polygon corresponding to the pixel, the RGBα value writing unit 162 provides the composed RGBα value to the pixel, and rewrites the RGBα value stored in the frame buffer 170 to the provided RGBα value. Therefore, the polygons of the transparent object are processed by the hidden surfaces processing and described on the screen 520.

Herein, the alpha value of the polygon is the α value. That is, as indicated in the equation (6), the larger the α value is, the larger the alpha value of the polygon is, because the compositing ratio of the RGB value of the polygon becomes larger. Further, as indicated in the equation (5), the larger the brightness of the polygon is, the larger the alpha value is, because the α value becomes larger.

Next, the flow of the processing carried out by the processing unit 100 will be explained with reference to FIG. 7.

Figure 7:
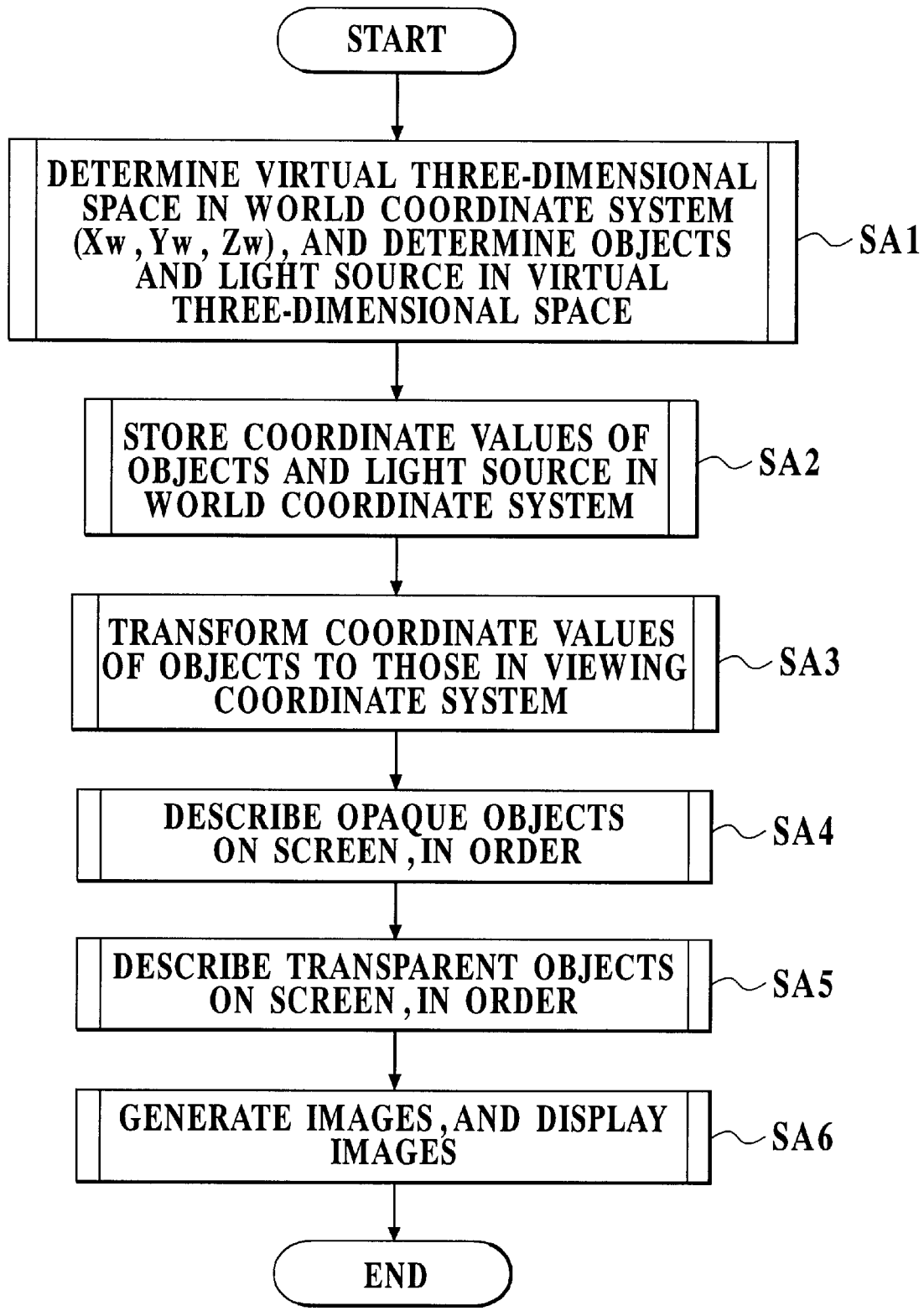
FIG. 7 is a flowchart showing a flow of a processing carried out by the game apparatus according to the present invention.

FIG. 7 is a flowchart of the processing carried out by the processing unit 100 for one frame.

First, the processing unit 100 represents and determines the virtual three-dimensional space in the world coordinate system (Xw, Yw, Zw). Then, the processing unit 100 determines the position and the direction of the object set (the representative point of the object set) such as the plane model 502 and so on, the positions and the directions of the objects (the representative points of the objects), the position of the view point, the eyes vector, and the light vector in the virtual three-dimensional space (Step SA1).

The position and the direction of the object set are determined, and thereby the positions and the directions of the objects constituting the object set are determined. Further, the position and the direction of each object are determined, and thereby the coordinate values of the vertexes of the polygons constituting the object are represented in the world coordinate system.

Therefore, the processing unit 100 operates the normal vector of each polygon on the basis of the coordinate values of the vertexes of the polygon.

Then, the processing unit 100 stores the coordinate values of the representative point of each object set, the coordinate values of the representative point of each object, the coordinate values of the vertexes of each polygon, the normal vector of each polygon, the coordinate values of the view point, the eyes vector, and the light vector, in the world coordinate system, therein (Step SA2).

Then, the processing unit 100 transforms the coordinate values and the direction (the vector) represented in the world coordinate system and stored therein, to those represented in the viewing coordinate system, on the basis of the coordinate values of the view point and the eyes vector, (Step SA3).

Then, the processing unit 100 sorts the objects into the opaque objects and the transparent objects on the basis of the identifier of each object. Then, the processing unit 100 ordinarily transforms the polygons constituting each opaque object to those represented in the screen coordinate system, operates the brightness of each vertex of the polygons, operates the RGBα values of the polygons by the shading processing, processes the polygons by the hidden surfaces processing according to the Z buffer algorithm, and writes the RGBα values in the frame buffer 170. Thereby, the processing unit 100 describes the opaque objects on the screen, in order (Step SA4).

Then, in case a plurality of transparent objects are included in the objects, the processing unit 100 sorts the plurality of transparent objects in order of Z value, on the basis of the Z value of the representative point of each transparent object in the viewing coordinate system. Then, the processing unit 100 describes the plurality of transparent objects on the screen, in order of Z value (Step SA5).

Figure 8:
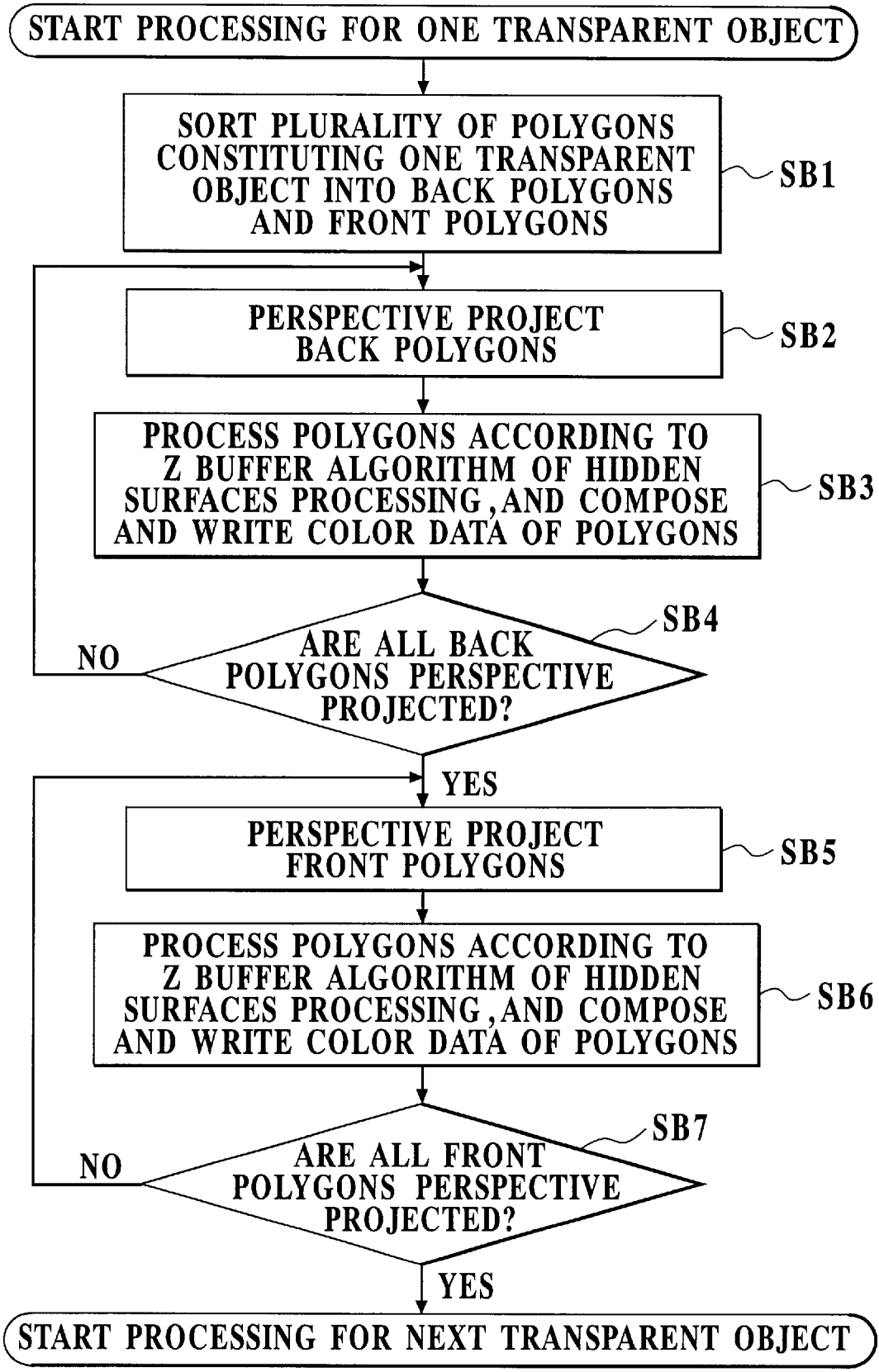
FIG. 8 is a flowchart showing a flow of a processing of describing a transparent object carried out by the game apparatus according to the present invention.

Herein, at the Step SA5, the flow of the processing when the processing unit 100 describes the transparent objects in order is shown in FIG. 8.

That is, the processing unit 100 sorts a plurality of polygons constituting one transparent object into the polygons constituting the back of the transparent object and the polygons constituting the front of the transparent object, on the basis of the above-described equation (3) (Step SB1).

Then, the processing unit 100 performs the perspective projection processing, and transforms the polygons constituting the back to those represented in the screen coordinate system, in order (Step SB2). Then, the processing unit 100 operates the RGBα values of the polygons by operating the brightness of each vertex of the polygons, processes the polygons according to the Z buffer algorithm of the hidden surfaces processing, composes the RGBα values as color data of the polygons, according to the α value, and writes the composed RGBα values of the polygons in the frame buffer 170 (Step SB3).

Then, after perspective projecting all polygons constituting the back (Step SB4; YES), the processing unit 100 performs the perspective projection processing, and transforms the polygons constituting the front to those represented in the screen coordinate system, in order (Step SB5). Then, the processing unit 100 operates the RGBα values of the polygons by operating the brightness of each vertex of the polygons, processes the polygons according to the Z buffer algorithm of the hidden surfaces processing, composes the RGBα values as color data of the polygons, according to the α value, and writes the composed RGBα values of the polygons in the frame buffer 170 (Step SB6).

Then, after perspective projecting all polygons constituting the front (Step SB7; YES), the processing unit 100 starts the above-described processing of composing and representing, for the next transparent object.

Then, as shown in FIG. 7, when the processing unit 100 performs the processing of composing and representing for all transparent objects, the processing unit 100 generates images by generating color of each pixel on the basis of the RGB value of each pixel stored in the frame buffer 170. Thereafter, when the processing unit 100 outputs the generated images to the display unit 400, the images are displayed on the display unit 400 (Step SA6).

When the processing unit 100 performs the above-described processing, for example, the image shown in FIG. 2 is displayed on the screen.

When the light is irradiated from the far side of the screen to the plane 2, because the light is reflected on the polygons constituting the back of the canopy 4, the color caused by the reflection of light on the back of the canopy 4 is displayed on the screen. Further, the pilot 6 is displayed on the screen so as to be disposed at the nearer side than the back of the canopy 4. Furthermore, the front of the canopy 4 is displayed on the screen so as to be translucent (transparent).

On the other hand, when the light is irradiated from the near side of the screen to the plane 2, for example, the image shown in FIG. 3 is displayed on the screen.

Because the light is irradiated from the near side, the light is reflected on the polygons constituting the front of the canopy 4, the color caused by the reflection of light on the front of the canopy 4 is displayed on the screen. Further, because the light is reflected on the front of the canopy 4, the alpha value of the front of the canopy 4 becomes high. Therefore, because the color of the pilot 6 at the far side of the front of the canopy 4 has less influence on the screen, the image with the vague pilot 6 can be displayed on the screen.

That is, the processing unit 100 describes the transparent object after describing the opaque object, and regarding the transparent object, the processing unit 100 describes the polygons constituting the front of the transparent object after describing the polygons constituting the back of the transparent object. Accordingly, it is possible to display the images as shown in FIGS. 2 and 3 on the screen.

Further, according to the present embodiment, the processing unit 100 sorts a plurality of polygons into the transparent polygons and the opaque polygons, for every object. Accordingly, the sorting processing is more reduced than the case the processing unit 100 sorts all polygons. That is, because the number of the objects is less than the number of the polygons, when the processing unit 100 sorts the polygons into the transparent polygons and the opaque polygons, for every object, the sorting processing can be more reduced than the case of for every polygon.

Further, because the description order of all transparent polygons is decided on the basis of the Z value of the transparent object, the sorting processing is more reduced than the case of sorting all transparent polygons.

Further, in order to decide the description order of the transparent polygons included in one transparent object, the transparent polygons are sorted into only two of the polygons constituting the back and the polygons constituting the front. Accordingly, the sorting processing is more reduced than the case of giving prior order to all transparent polygons in describing. As described above, according to the embodiment of the present invention, it is possible to realize the realistic display by a relative simple processing.

Next, an exemplary hardware structure realizable of the embodiment of the present invention will be explained with reference to FIG. 9, as follows.

Figure 9:
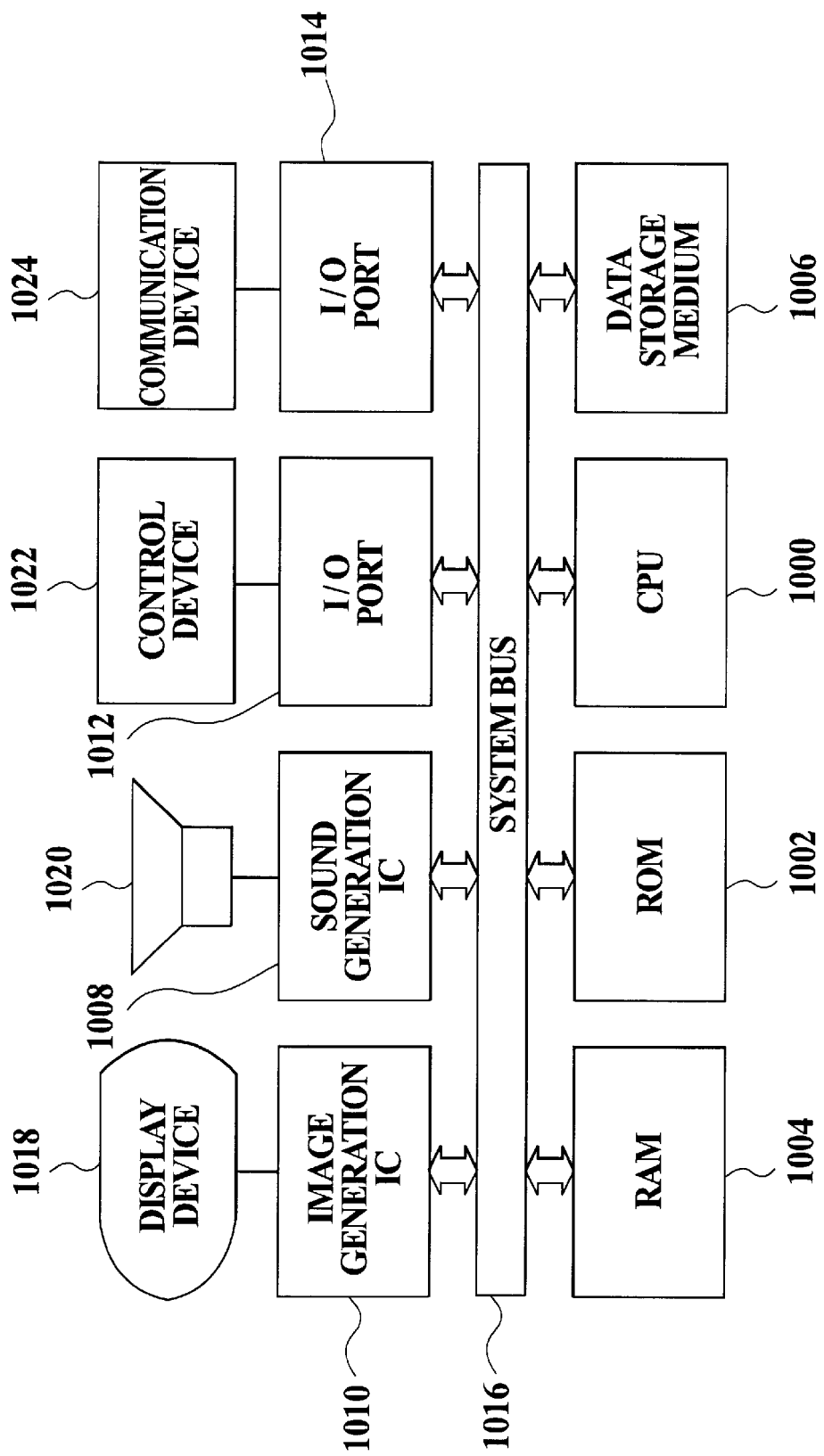
FIG. 9 is a block diagram showing an exemplary hardware configuration realizable of the game apparatus according to an embodiment of the present invention.

An apparatus as shown in FIG. 9 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween. A display device 1018 is further connected to the image generation IC 1010, a speaker 1020 is further connected to the sound generation IC 1008, a control device 1022 is further connected to the I/O port 1012, and a communication device 1024 is further connected to the I/O port 1014.

The apparatus comprising the CPU 1000, the ROM 1002, the RAM 1004, the sound generation IC 1008, the image generation IC 1010, the I/O port 1012, the I/O port 1014, the system bus 1006, and the communication device 1024, corresponds to the game apparatus body, and the processing unit 100 shown in FIG. 4 can be achieved in the above-described apparatus. The communication device 1024 may be contained in or provided outside the covering body of the game apparatus body.

The data storage medium 1006 stores primarily a program, object data for determining objects, texture data for mapping textures on the objects, color data concerning color information of vertexes of polygons, sound data, play data, and so on. The storage unit 200 shown in FIG. 4 can be achieved in the data storage medium 1006.

In case the apparatus realizable of the embodiment of the present invention is a computer system, a CD-ROM, a DVD, a MO, a hard disc or other medium is used as the data storage medium 1006 for storing the game program 210 and other data. In case the apparatus realizable of the embodiment of the present invention is a consumer game machine, a CD-ROM, a DVD, a game cassette, a hard disc or other medium is used as the data storage medium 1006. In case the apparatus realizable of the embodiment of the present invention is an arcade game machine, a hard disc, a a semiconductor memory such as a Rom or other medium is used as the data storage medium 1006. In this case, the program and the data stored in the storage unit 200 may be stored in the ROM 1002. Further, it is unnecessary that the program and the data stored in the storage unit 200 are stored in one storage medium. If the program and the data can be separated from each other, they may be separately stored in storage mediums. For example, the game program 210 may be stored in one storage medium, and the game data 220 may be stored in another storage medium.

The control device 1022 is equivalent to a game controller, an input operating panel or the like. Further, the control device 1022 is one used by a player when the player inputs the decision results while playing the game to the apparatus body.

The CPU 1000 controls the overall of the apparatus and processes various data, according to the game program stored in the data storage medium 1006, the system program including initialization data for the apparatus and so on, stored in the ROM 1002, signals inputted by the control device 1022, or the like.

The RAM 1004 is a storage means used as an operating memory by the CPU 1000, or the like. Further, the RAM 1004 stores the particular contents of the data storage medium 1006 or the ROM 1002, operating results of the CPU 1000, or the like. The temporary storage unit 124 shown in FIG. 4, can be achieved in the function of the RAM 1004. For example, the coordinate values of the representative points of the objects and the object sets, the coordinate values of the vertexes constituting the polygons, the coordinate values of the light source and the view point, and so on are stored in the RAM 1004 temporarily.

The sound generation IC 1008 and the image generation IC 1010 are also disposed in such a type of game apparatus to generate and output sounds and images appropriate to the game.

The sound generation IC 1008 is an integrated circuit for generating game sounds such as sound effects, background music and so on, on the basis of the data stored in the data storage medium 1006 or the ROM 1002, according to the operation signal outputted from the CPU 1000. The game sounds generated by the sound generation IC 1008 are outputted from the speaker 1020.

The image generation IC 1010 is an integrated circuit for generating pixel data to be outputted to the display device 1018, on the basis of the coordinate values, the color data or the like outputted from the RAM 1004, the ROM 1002, the data storage medium 1006, or the like, according to the operation signal outputted from the CPU 1000. That is, the function of the image generation unit 150 shown in FIG. 4 can be primarily achieved in the image generation IC 1010. The image generation IC 1010 comprises a VRAM as the projection data storage unit 166.

The display device 1018 means a display device such as a CRT, a LCD, a TV, a head mount display, a plasma display, a projector or the like.

The communication device 1024 is a device for communicating various data used by the game apparatus with an external device. If the game apparatus is connected with another game apparatus, the communication device 1024 is used for communicating game programs, predetermined data corresponding to game programs, or other data with another game apparatus, through the communications line.

The storage medium 1006 may be portable or non-portable, and may be contained in or provided outside the game apparatus body.

Figure 10:
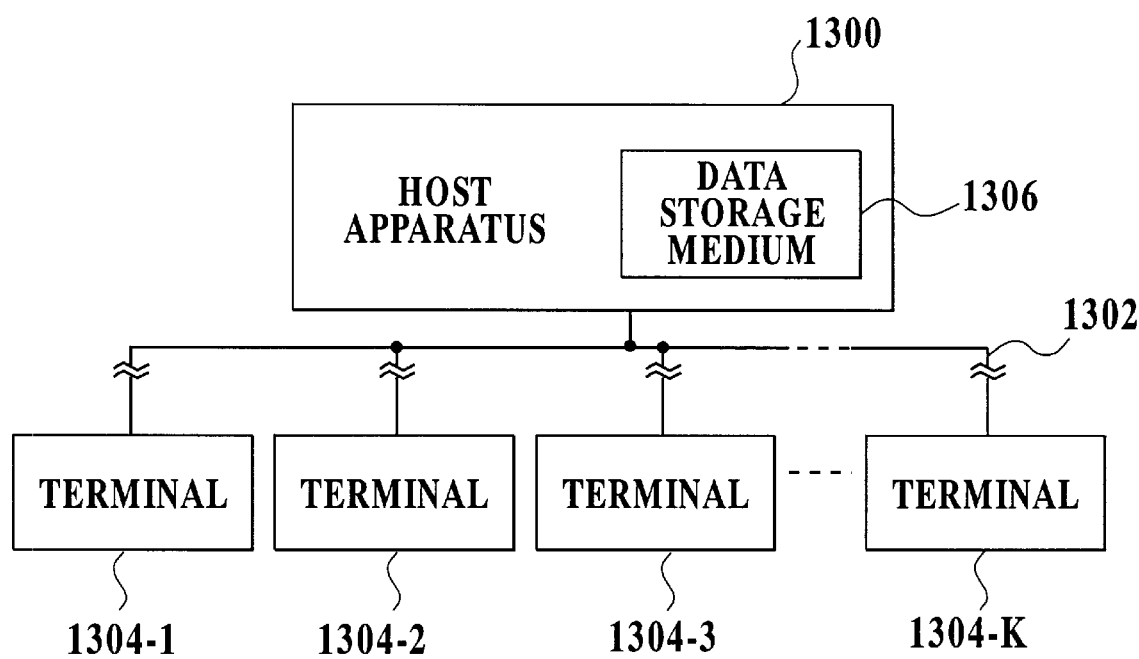
FIG. 10 is a block diagram showing an exemplary case the embodiment of the present invention is applied to a game terminal apparatus connectable of a host apparatus through a communication line.

FIG. 10 shows an exemplary case wherein the embodiment of the present invention is applied to a game system comprising a host apparatus 1300 and terminals 1304-1 to 1304-k connected to the host apparatus 1300 through a network 1302. Herein, "k" is an integral number which is not less than 2, and the host apparatus 1300 is connected to "k" of terminals.

In FIG. 10, the game program 210, the game data 220 and so on, stored in the storage unit 200 shown in FIG. 4, are stored in, for example, a data storage medium 1306 under control of the host apparatus 1300, such as a magnetic disk device, a magnetic tape device, a memory, or other medium.

In case each of the terminals 1304-1 to 1304-k comprises a CPU, an image generation IC and a sound generation IC and can generate game images and game sounds with standing alone, the host apparatus 1300 distributes the game program, data and so on stored in the data storage medium 1306, to the terminals 1304-1 to 1304-k, through the communication line 1302.

On the other hand, in case each of the terminals 1304-1 to 1304-k cannot generate game images and game sounds with standing alone, the host apparatus 1300 generates game images and game sounds, to distribute them to the terminals 1304-1 to 1304-k. Therefore, each terminal outputs the game images and the game sounds.

Although the present invention has been explained according to the above-described embodiment, it should also be understood that the present invention is not limited to the embodiment and various changes and modifications may be made to the invention without departing from the gist thereof.

According to the above-described embodiment, a plurality of polygons constituting each transparent object are sorted into polygons constituting the back of the transparent object and polygons constituting the front of the transparent object, before the transparent object is perspective projected. However, each transparent object may be perspective projected without sorting a plurality of polygons constituting the transparent object. In other words, in case of translucent composing a plurality of polygons constituting each transparent object by the Z buffer algorithm in the frame buffer 170, polygons constituting the back of the transparent object are translucent composed first, and color data of the polygons are written in the frame buffer 170, and after polygons constituting the front of the transparent object are translucent composed, and color data of the polygons are written in the frame buffer 170.

Figure 11:
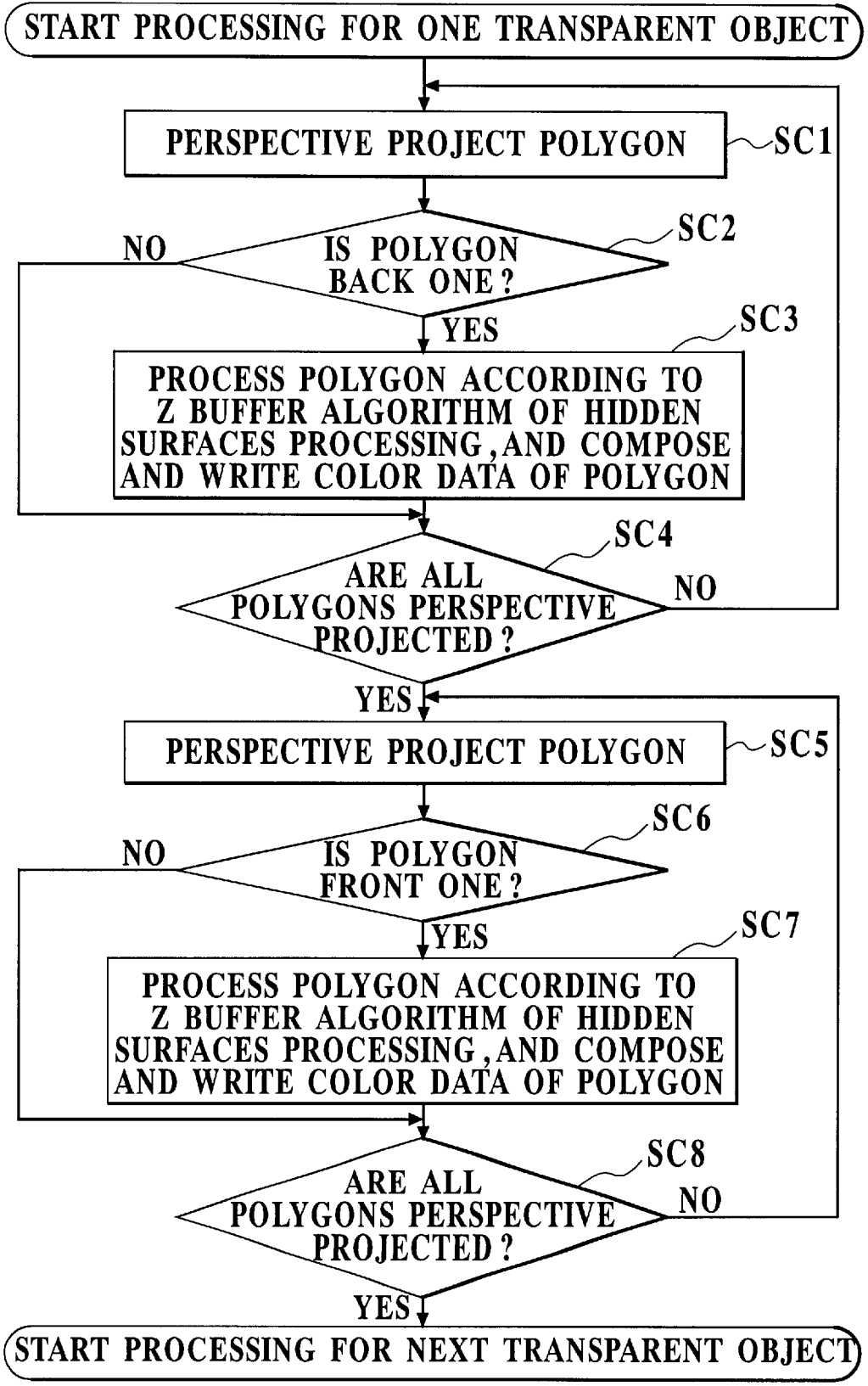
FIG. 11 is a flowchart showing a flow of a processing of describing a transparent object carried out by the game apparatus according to the present invention.

For example, the processing unit 100 may perform the perspective projection processing to each transparent object twice. That is, after describing all opaque objects according to the Z buffer algorithm, at the above-described Step SA5, the flow of the processing when the processing unit 100 describes the transparent objects in order is shown in FIG. 11.

First, when the processing unit 100 perspective projects the polygons constituting one transparent object (Step SC1), the processing unit 100 determines whether the polygon is back one constituting the back of the transparent object or front one constituting the front of the transparent object, on the basis of the angle between the normal vector and the eyes vector (Step SC2).

Then, in case the processing unit 100 determines that the polygon is back one (Step SC2; YES), the processing unit 100 processes the polygon according to the Z buffer algorithm of the hidden surfaces processing, and composes and writes color data of the polygon (Step SC3). On the other hand, in case the processing unit 100 determines that the polygon is front one (Step SC2; NO), the processing unit 100 does not describe the polygon.

The processing unit 100 processes the above-described processing to all polygons constituting the transparent object in voluntary order (Step SC4).

Then, after processing the above-described processing to all polygons (Step SC4; YES), when the processing unit 100 again perspective projects the polygons constituting the same transparent object (Step SC5), the processing unit 100 determines whether the polygon is back one constituting the front of the transparent object or front one constituting the back of the transparent object, on the basis of the angle between the normal vector and the eyes vector (Step SC6).

Then, in case the processing unit 100 determines that the polygon is front one (Step SC6; YES), the processing unit 100 processes the polygon according to the Z buffer algorithm of the hidden surfaces processing, and composes and writes color data of the polygon (Step SC7). On the other hand, in case the processing unit 100 determines that the polygon is back one (Step SC6; NO), the processing unit 100 does not describes the polygon. The processing unit 100 processes the above-described processing to all polygons constituting the transparent object in voluntary order (Step SC8).

Then, the processing unit 100 carries out the above-described twice perspective projection processing to a plurality of transparent objects in order of Z value. In the case as well, the images shown in FIGS. 2 and 3 are displayed on the screen.

Further, according to the above-described embodiment, before perspective projecting each transparent object, the processing unit 100 sorts a plurality of polygons constituting the transparent object into polygons constituting the back of the transparent object and polygons constituting the front of the transparent object. However, the processing unit 100 sorts the polygons in order of Z value.

That is, after processing and describing all opaque objects according to the Z buffer algorithm of the hidden surfaces processing, the processing unit 100 operates the Z values of a plurality of polygons constituting the transparent object. Basically, the Z values of a plurality of vertexes constituting the polygon are averaged, and thereby the Z value of the polygon is determined. Then, the processing unit 100 sorts a plurality of polygons in order of Z value. Then, when the processing unit 100 perspective projects the plurality of polygons in order of Z value, in order, the processing unit 100 processes the perspective projected polygons according to the Z buffer algorithm of the hidden surfaces processing, and composes and describes the polygons.

Then, the processing unit 100 processes a plurality of transparent objects by the above-described processing, in order of Z value. In the case as well, the images shown in FIGS. 2 and 3 are displayed on the screen.

Figure 12:
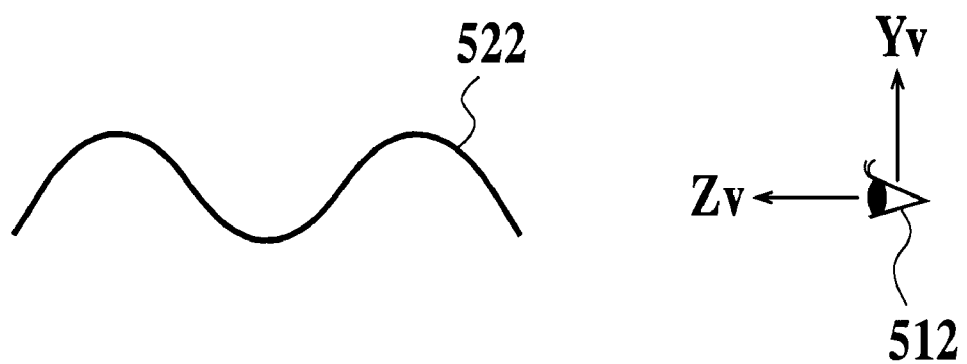
FIG. 12 is a view for explaining a compositing principle of a game image of the game apparatus according to the present invention.

Further, even if the transparent object 522 is formed in a zigzag as shown in FIG. 12, because a plurality of polygons are composed and described in order of Z value, the transparent object 522 is displayed clearly and realistically without inconsistency.

Further, according to the above-described embodiment, the identifier for identifying each object as a transparent object or an opaque object is provided for every object. However, the identifier for identifying each polygon as a transparent object or an opaque polygon may be provided for every polygon.

In the case, the processing unit 100 sorts a plurality of polygons into transparent polygons and opaque polygons before describing the polygons, and sorts a plurality of transparent polygons in order of Z value. Then, the processing unit 100 processes the opaque polygons according to the Z buffer algorithm of the hidden surfaces processing in order, and describes the polygons. Then, the processing unit 100 processes the transparent polygons according to the Z buffer algorithm of the hidden surfaces processing in order of Z value, and composes and describes the polygons. In the case as well, the images shown in FIGS. 2 and 3 are displayed on the screen.

Further, even if the transparent object 522 is formed in a zigzag as shown in FIG. 12, because a plurality of polygons are composed and described in order of Z value, the transparent object 522 is displayed clearly and realistically without inconsistency.

Further, according to the above-described embodiment, it has mainly been explained that the present invention is applied to the flight game. However, the present invention may be applied to another game, for example, a football game, a baseball game, a sports game, a fighting action game, a racing game, a roll playing game, a simulation game, a gun game, and so on. For example, according to a car racing game, even if a window glass of a car model is modeled as a transparent object or transparent polygons, the window glass can be displayed on the screen, like the canopy 4 as described above.

Further, the present invention can be applied not only to the consumer game machine and the arcade game machine but also to a simulator, a game machine for a large-scale attraction in which a lot of players participate, a personal computer, a work station, a conventional computer game, or the like.

A main effect according to the embodiment of the present invention will be indicated, as follows.

According to the present invention, in case one transparent polygon is at the far side of another transparent polygon, the near transparent polygon is described with color data on which color data of the far transparent polygon are reflected. Consequently, it is possible to express an image as one transparent polygon is at the far side of another transparent polygon. That is, according to the present invention, even if a plurality of transparent polygons and a plurality of opaque polygons are positioned in any order in the eyes direction, it is possible to display the realistic image on a screen. For example, because it is possible to express an image as light reflected on the far transparent polygon is reflected on the near transparent polygon, it is possible to display the realistic image on the screen.

The entire disclosure of Japanese Patent Application No. Tokugan 2000-376703 filed on Dec. 11, 2000 including specification, claims, drawings and summary are incorporated herein by reference in its entirety.

What is claimed is:

1. A method for generating image data of a virtual three-dimensional space viewed from a predetermined view point, comprising:

determining a plurality of transparent primitive surfaces in the virtual three-dimensional space;

operating an angle between an eyes direction at the predetermined view point and a normal direction to each of the transparent primitive surfaces;

deciding a description order of the plurality of transparent primitive surfaces so as to give priority one of the transparent primitive surfaces when the angle is an acute angle over one of the transparent primitive surfaces when the angle is an obtuse angle; and describing the plurality of transparent primitive surfaces by composing color data of the transparent primitive surfaces in the description order.

2. The method as claimed in claim 1, further comprising:

deciding the description order of the plurality of transparent primitive surfaces so as to give priority one of the transparent primitive surfaces when the angle is an acute angle over another of the transparent primitive surfaces when the angle is an acute angle in order of far from the predetermined view point and so as to give priority one of the transparent primitive surfaces when the angle is an obtuse angle over another of the transparent primitive surfaces when the angle is an obtuse angle in order of far from the predetermined view point.

3. The method as claimed in claim 1, further comprising:

describing a primitive surface other than the plurality of transparent primitive surfaces before describing the transparent primitive surfaces.

4. The method as claimed in claim 3, further comprising:

performing a predetermined hidden surfaces processing to the primitive surface other than the plurality of transparent primitive surfaces and the plurality of transparent primitive surfaces, and describing the transparent primitive surfaces.

5. The method as claimed in claim 1, further comprising:

deciding the description order so as to give priority an object including primitive surfaces other than the plurality of transparent primitive surfaces over an object including the plurality of transparent primitive surfaces, for every object; and describing the primitive surfaces other than the plurality of transparent primitive surfaces and the transparent primitive surfaces, for every object, in the description order.

6. The method as claimed in claim 1, further comprising:

determining a light source in the virtual three-dimensional space;

operating brightness of the transparent primitive surfaces on the basis of the light source; and deciding color data of the transparent primitive surfaces on the basis of the brightness.

7. The method as claimed in claim 1, further comprising:

determining at least one of the transparent primitive surfaces to be at least one portion of a predetermined vehicle object or a predetermined plane object in the virtual three-dimensional space.

8. The method as claimed in claim 1 performed on a game apparatus, further comprising:

executing a predetermined game; and generating game image data of the predetermined game, comprising the image data of the virtual three-dimensional space.

9. An apparatus adapted to carry out the method as claimed in claim 1.

10. A storage medium having a program recorded thereon, when the program is loaded onto an operating apparatus, the program making the operating apparatus execute the method as claimed in claim 1.

11. A program, when the program is loaded onto an operating apparatus, to make the operating apparatus execute the method as claimed in claim 1.

12. A program product comprising a storage medium having a program recorded thereon, when the program is loaded onto an operating apparatus, the program making the operating apparatus execute the method as claimed in claim 1.

13. A method for generating image data of a virtual three-dimensional space viewed from a predetermined view point, comprising:

determining a plurality of primitive surfaces including an opaque primitive surface and a plurality of transparent primitive surfaces in the virtual three-dimensional space;

deciding a first description order of the plurality of primitive surfaces so as to give priority the opaque primitive surface over the plurality of transparent primitive surfaces;

operating an angle between an eyes direction at the predetermined view point and a normal direction to each of the transparent primitive surfaces;

deciding a second description order of the plurality of transparent primitive surfaces so as to give priority one of the transparent primitive surfaces when the angle is an acute angle over one of the transparent primitive surfaces when the angle is an obtuse angle; and performing a hidden surfaces processing to the plurality of primitive surfaces according to a Z buffer algorithm, writing color data of the opaque primitive surface in a frame buffer, and writing color data composed of color data of each of the transparent primitive surfaces and the color data written in the frame buffer, in the frame buffer, in the first description order and the second description order.

* * * * *